United States Patent
Sudo et al.

(10) Patent No.: US 12,265,206 B2
(45) Date of Patent: Apr. 1, 2025

(54) ZOOM LENS AND IMAGE PICKUP APPARATUS

(71) Applicant: CANON KABUSHIKI KAISHA, Tokyo (JP)

(72) Inventors: Kenta Sudo, Tochigi (JP); Masakazu Kodaira, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 625 days.

(21) Appl. No.: 17/492,413

(22) Filed: Oct. 1, 2021

(65) Prior Publication Data

US 2022/0113521 A1    Apr. 14, 2022

(30) Foreign Application Priority Data

Oct. 8, 2020   (JP) ................................ 2020-170344
Oct. 15, 2020  (JP) ................................ 2020-173779

(51) Int. Cl.
  *G02B 15/14* (2006.01)
  *G02B 13/02* (2006.01)
  *G02B 13/06* (2006.01)
  *G02B 27/00* (2006.01)

(52) U.S. Cl.
  CPC ..... *G02B 15/143507* (2019.08); *G02B 13/02* (2013.01); *G02B 13/06* (2013.01); *G02B 15/1425* (2019.08); *G02B 27/0025* (2013.01)

(58) Field of Classification Search
  USPC ................................ 359/676–686, 689, 691
  See application file for complete search history.

(56) References Cited

U.S. PATENT DOCUMENTS

| | | | | |
|---|---|---|---|---|
| 5,418,648 A | * | 5/1995 | Ono | G02B 15/1425 359/689 |
| 10,473,901 B2 | * | 11/2019 | Harada | G02B 13/02 |
| 2016/0139385 A1 | * | 5/2016 | Ishibashi | G02B 15/1425 359/680 |
| 2021/0093172 A1 | * | 4/2021 | Sone | G02B 23/2438 |
| 2022/0091400 A1 | * | 3/2022 | Tsubonoya | G02B 13/18 |
| 2022/0283415 A1 | * | 9/2022 | Tsubonoya | G02B 13/18 |

FOREIGN PATENT DOCUMENTS

| | | |
|---|---|---|
| JP | 2003-215453 A | 7/2003 |
| JP | 2007108702 A | 4/2007 |
| JP | 2014048589 A | 3/2014 |
| JP | 2016-062053 A | 4/2016 |
| JP | 2019008320 A | 1/2019 |
| WO | 2017/099244 A1 | 6/2017 |

\* cited by examiner

*Primary Examiner* — Darryl J Collins
(74) *Attorney, Agent, or Firm* — Canon U.S.A., Inc. IP Division

(57) ABSTRACT

A zoom lens includes, in order from an object side to an image side, a first lens unit having a negative refractive power and a second lens unit having a positive refractive power. A distance between adjacent lens units changes during zooming. The first lens unit includes two cemented lenses and each of the two cemented lenses includes a positive lens. Predetermined conditions are satisfied by the zoom lens.

15 Claims, 22 Drawing Sheets

ZOOM LENS AND IMAGE PICKUP APPARATUS

BACKGROUND OF THE DISCLOSURE

Field of the Disclosure

The aspect of the embodiments relates to a zoom lens and an image pickup apparatus.

Description of the Related Art

In recent years, zoom lenses used in monitoring cameras, digital still cameras, video cameras, or broadcast cameras have been required to have high optical performance which can support image sensors having higher definitions. In particular, monitoring cameras have been required to have small sizes from viewpoints of easy installation and inconspicuousness, and have been required to be able to capture images of wide ranges at wide-angle ends. Further, monitoring cameras have been required to sufficiently correct chromatic aberration from the center to the periphery of images in consideration of wavelengths in a near-infrared wavelength range in addition to the visible wavelength range.

Each of Japanese Patent Laid-Open Nos. ("JPs") 2003-215453 and 2016-62053 discloses a negative lead type zoom lens in which a first lens unit having a negative refractive power and a second lens unit having a positive refractive power move during zooming. However, with the zoom lens disclosed in JP 2003-215453, it is difficult to achieve both small size and wide angle. With the zoom lens disclosed in JP 2016-62053, it is difficult to achieve both small size and lateral chromatic aberration correction.

PCT International Application Publication No. ("WO") 2017/099244 discloses, as a zoom lens having a small size and a wide angle, a negative lead type zoom lens in which a first lens unit having a negative refractive power and a second lens unit having a positive refractive power move during zooming. However, the zoom lens disclosed in WO 2017/099244 is desired to have wider angle and to be capable of further correction of lateral chromatic aberration.

SUMMARY OF THE DISCLOSURE

A zoom lens according to one aspect of the embodiments includes, in order from an object side to an image side, a first lens unit having a negative refractive power and a second lens unit having a positive refractive power. A distance between adjacent lens units changes during zooming. The first lens unit includes two cemented lenses and each of the two cemented lenses includes a positive lens. Predetermined conditions are satisfied by the zoom lens.

An image pickup apparatus including the above zoom lens also constitutes another aspect of the embodiments.

A zoom lens according to one aspect of the embodiments includes, in order from an object side to an image side, a first lens unit having a negative refractive power and a second lens unit having a positive refractive power. During zooming, the first lens unit and the second lens unit move. The first lens unit includes at least two positive lenses. Predetermined conditions are satisfied by the zoom lens.

An image pickup apparatus including the above zoom lens also constitutes another aspect of the embodiments.

Further features of the disclosure will become apparent from the following description of exemplary embodiments with reference to the attached drawings.

DESCRIPTION OF THE EMBODIMENTS

Figure 1:
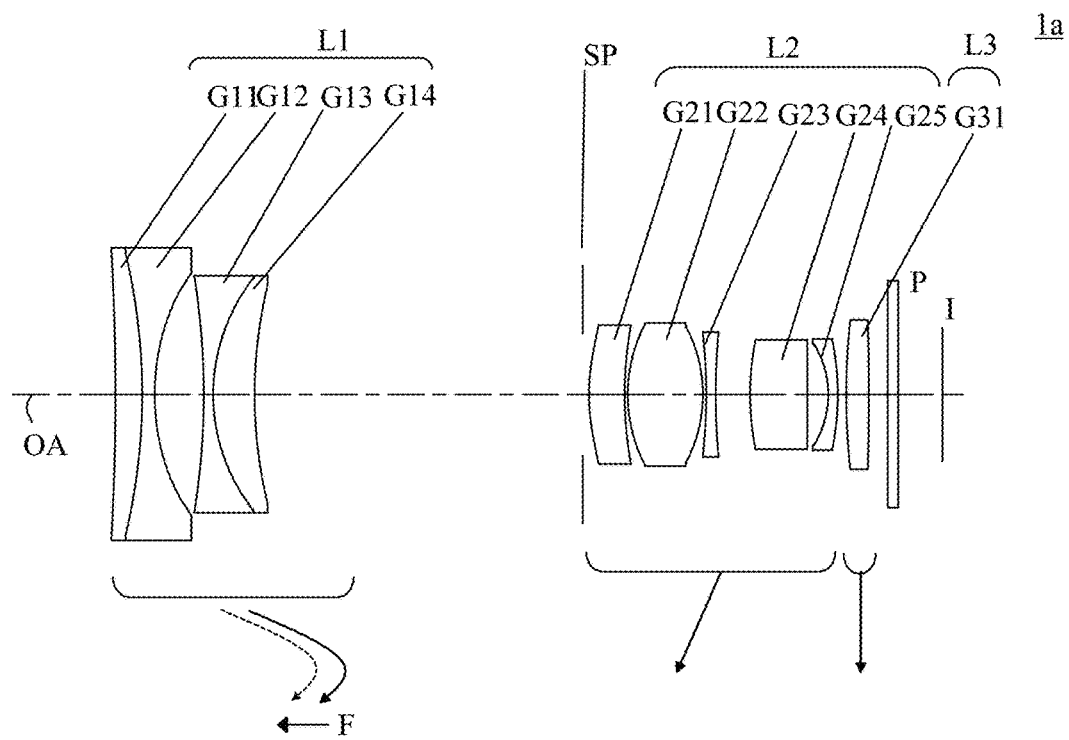
FIG. 1 is a diagram illustrating a lens section and a moving trajectory of a zoom lens at a wide-angle end according to an Example 1.
Figure 2A:
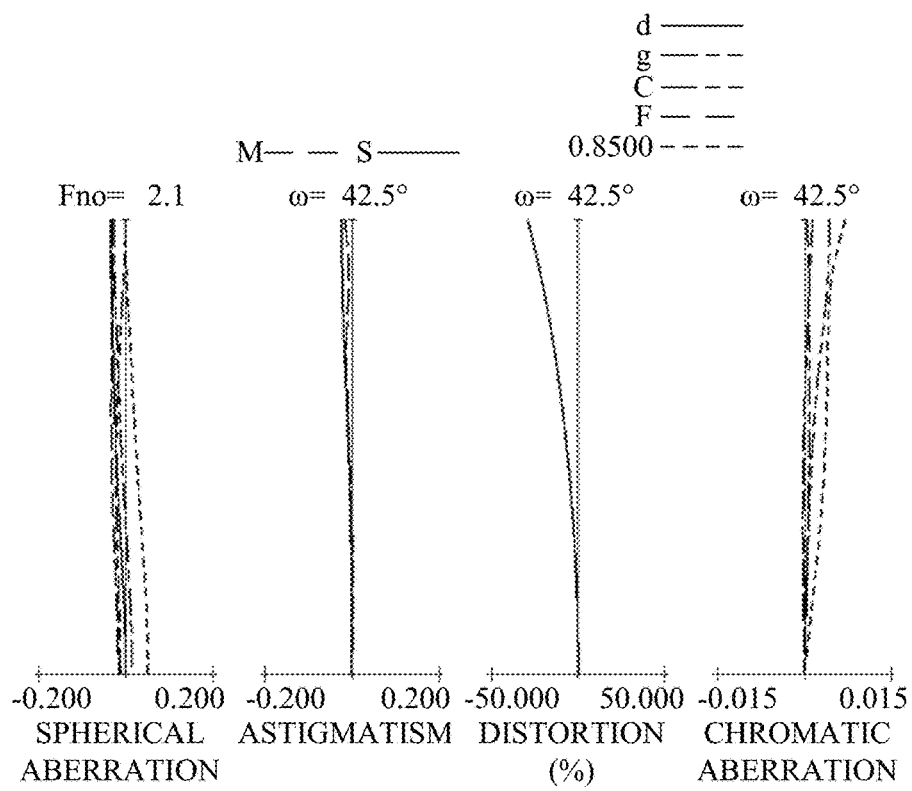
FIGS. 2A to 2C are aberration diagrams of the zoom lens at the wide-angle end, middle zoom position, and telephoto end according to the Example 1.
Figure 2B:
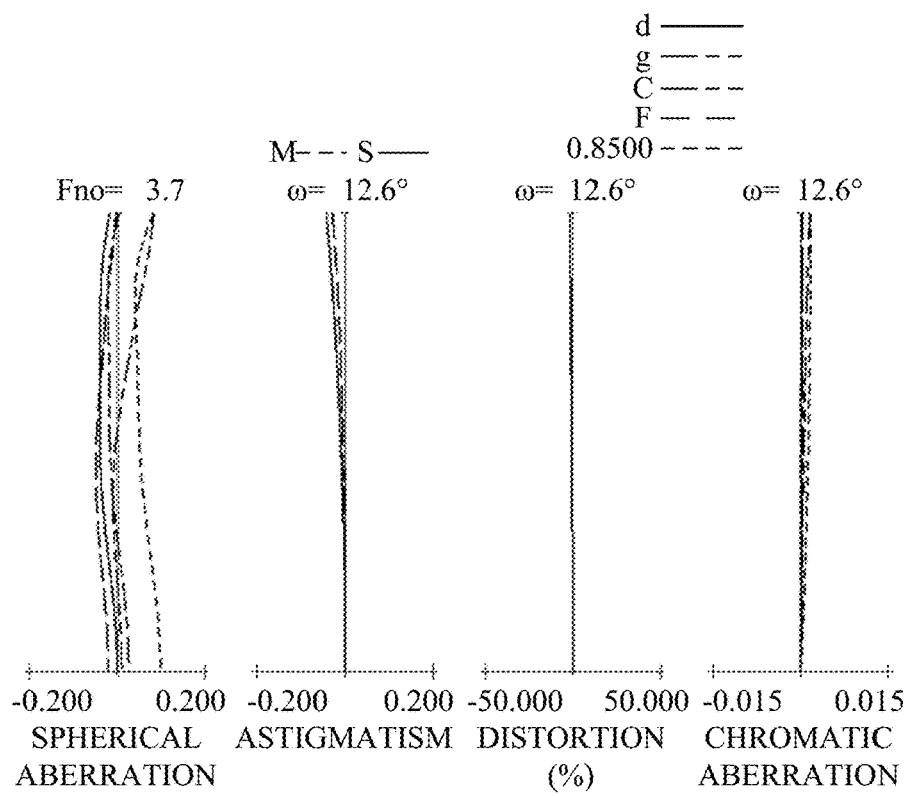
Figure 2C:
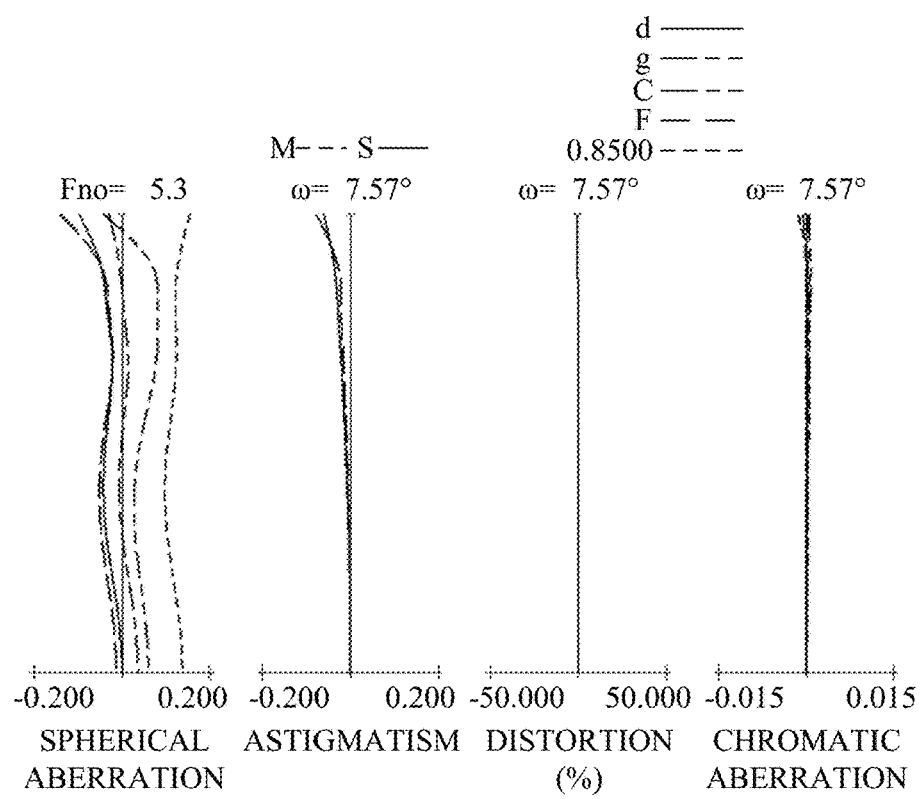
Figure 3:
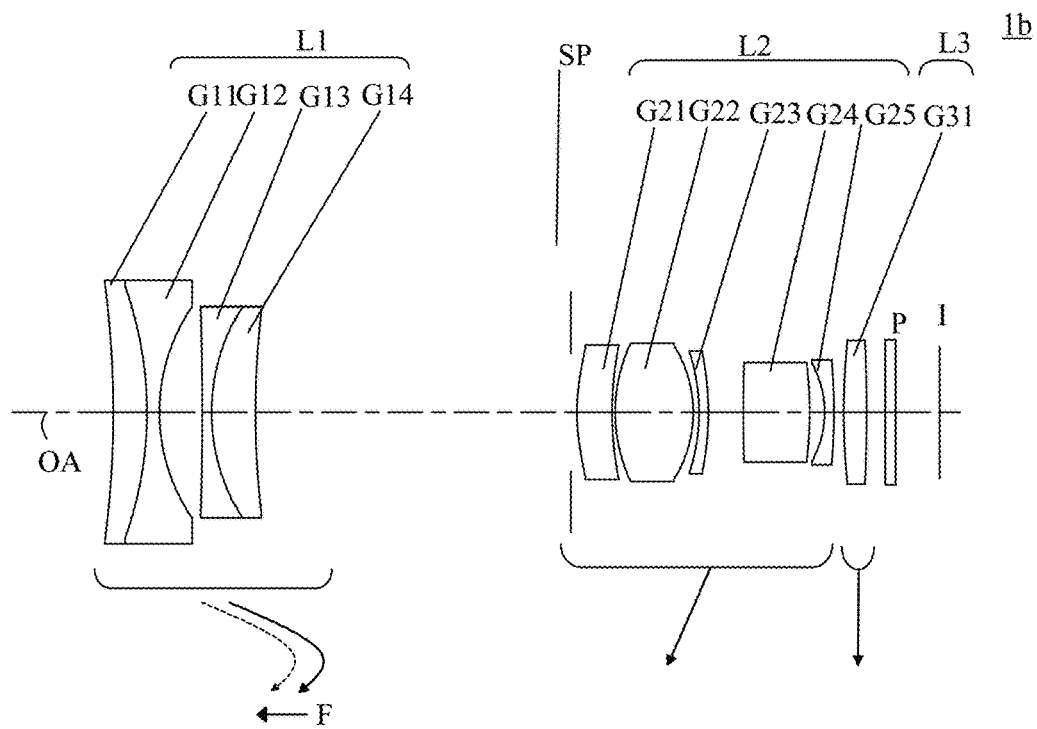
FIG. 3 is a diagram illustrating a lens section and a moving trajectory of a zoom lens at a wide-angle end according to an Example 2.
Figure 4A:
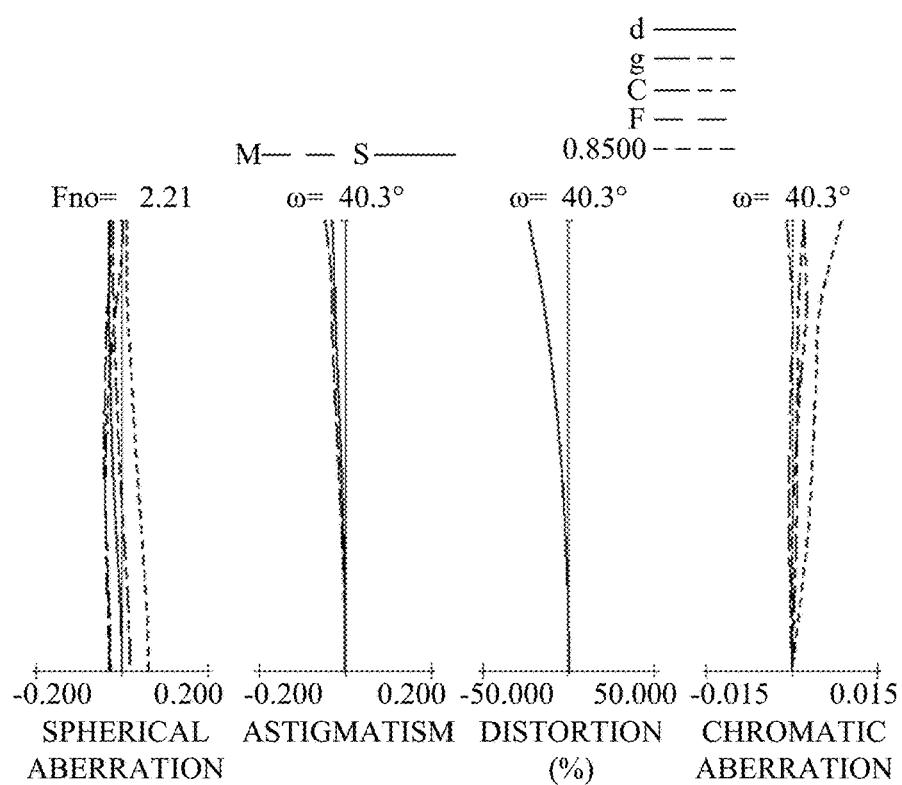
FIGS. 4A to 4C are aberration diagrams of the zoom lens at the wide-angle end, middle zoom position, and telephoto end according to the Example 2.
Figure 4B:
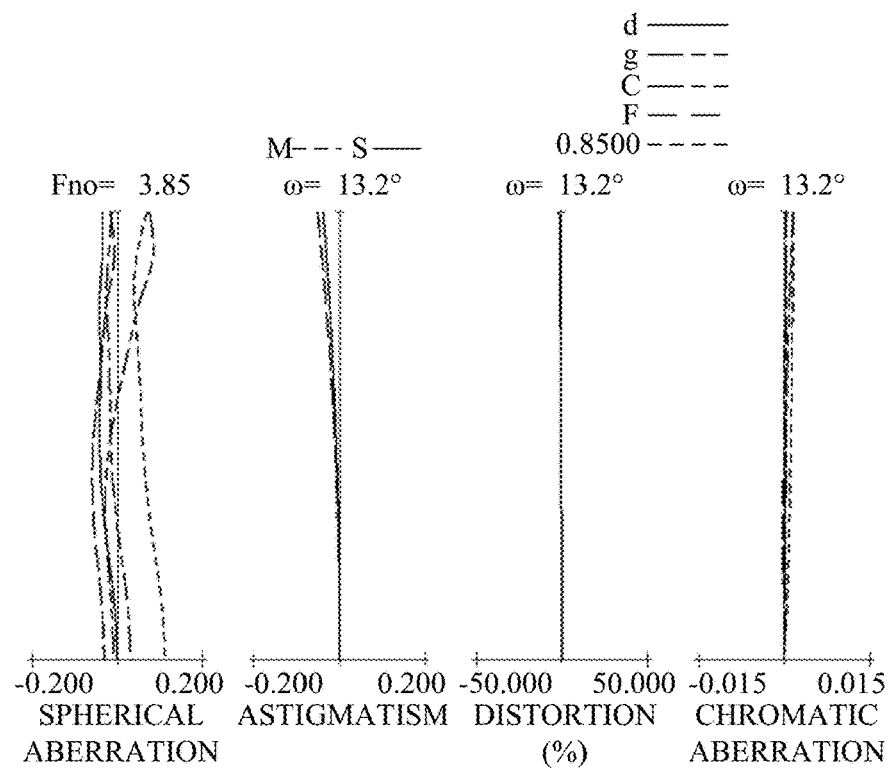
Figure 4C:
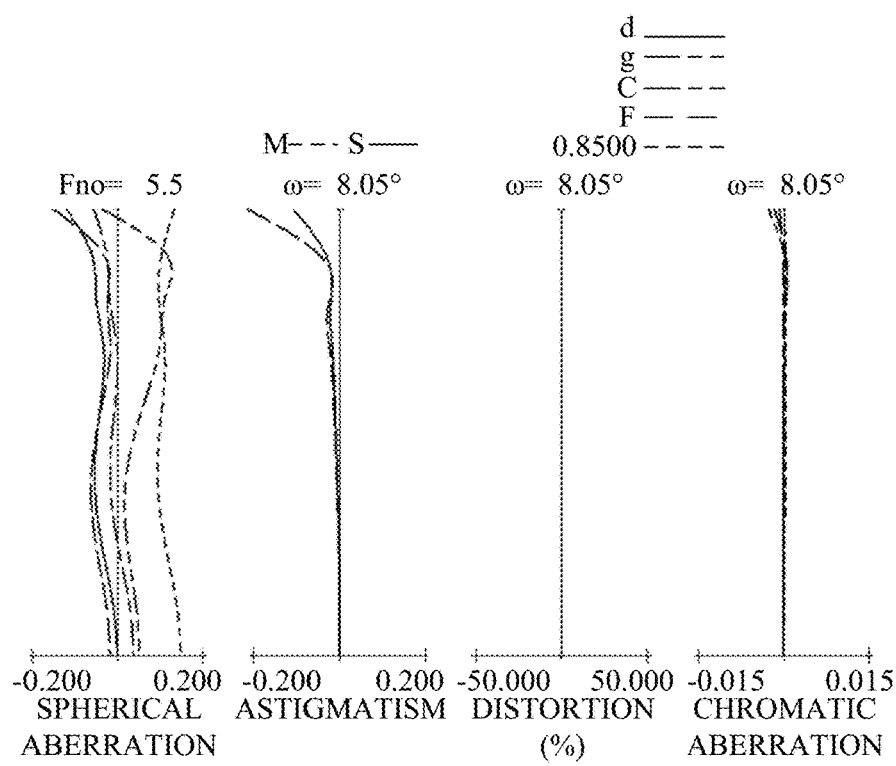
Figure 5:
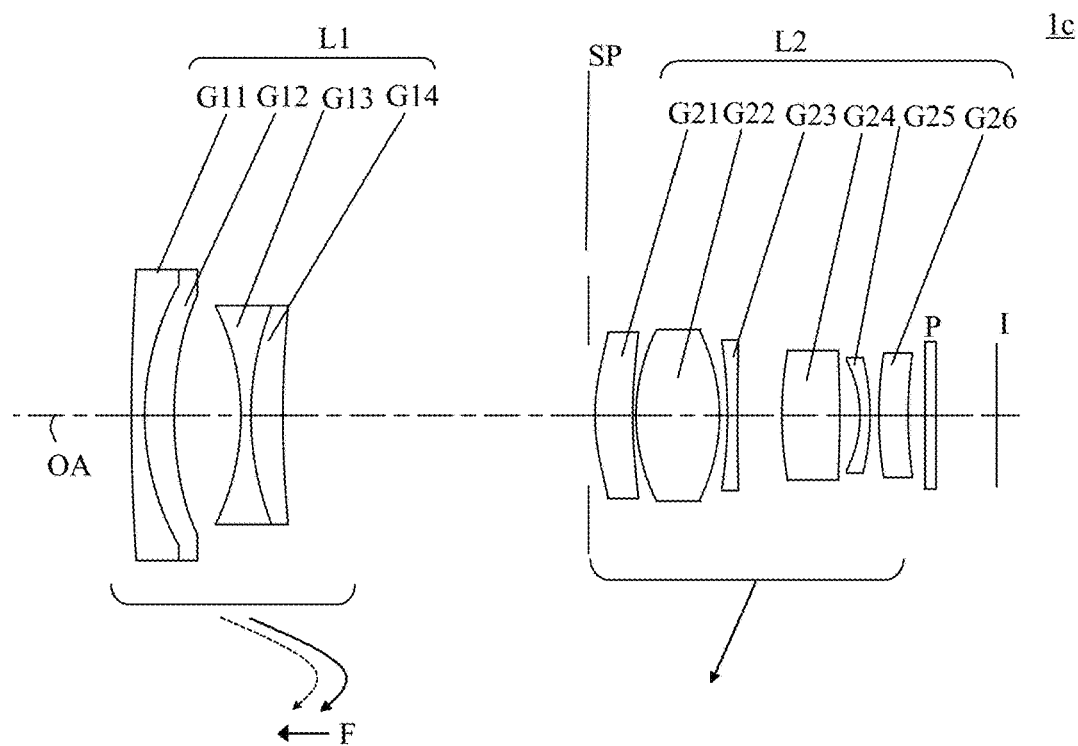
FIG. 5 is a diagram illustrating a lens section and a moving trajectory of a zoom lens at a wide-angle end according to an Example 3.
Figure 6A:
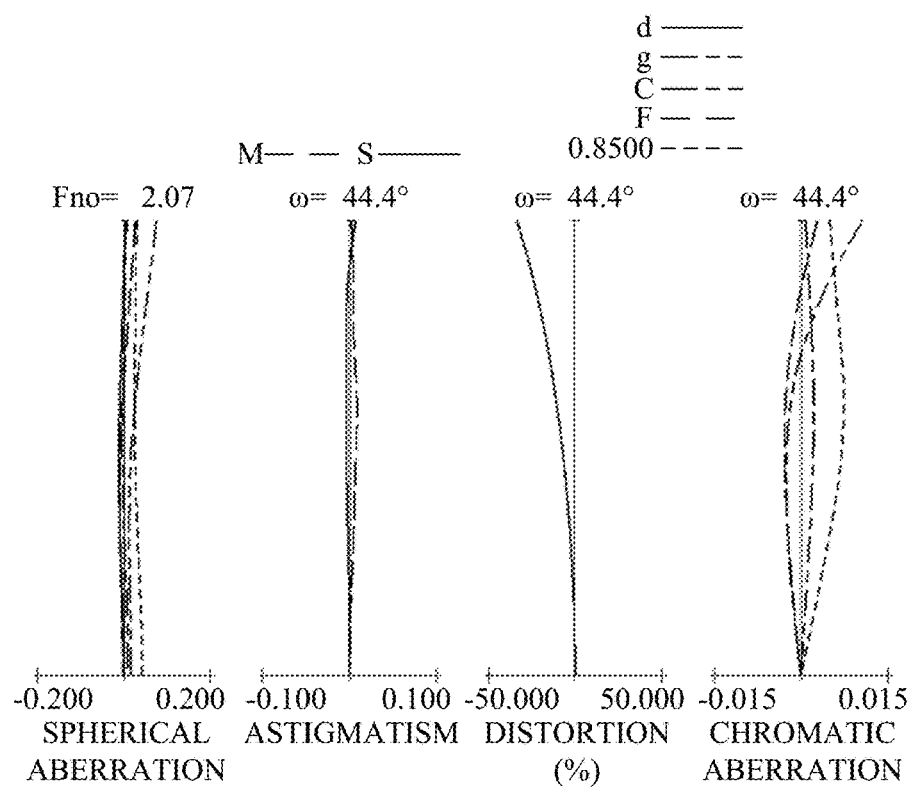
FIGS. 6A to 6C are aberration diagrams of the zoom lens at the wide-angle end, middle zoom position, and telephoto end according to the Example 3.
Figure 6B:
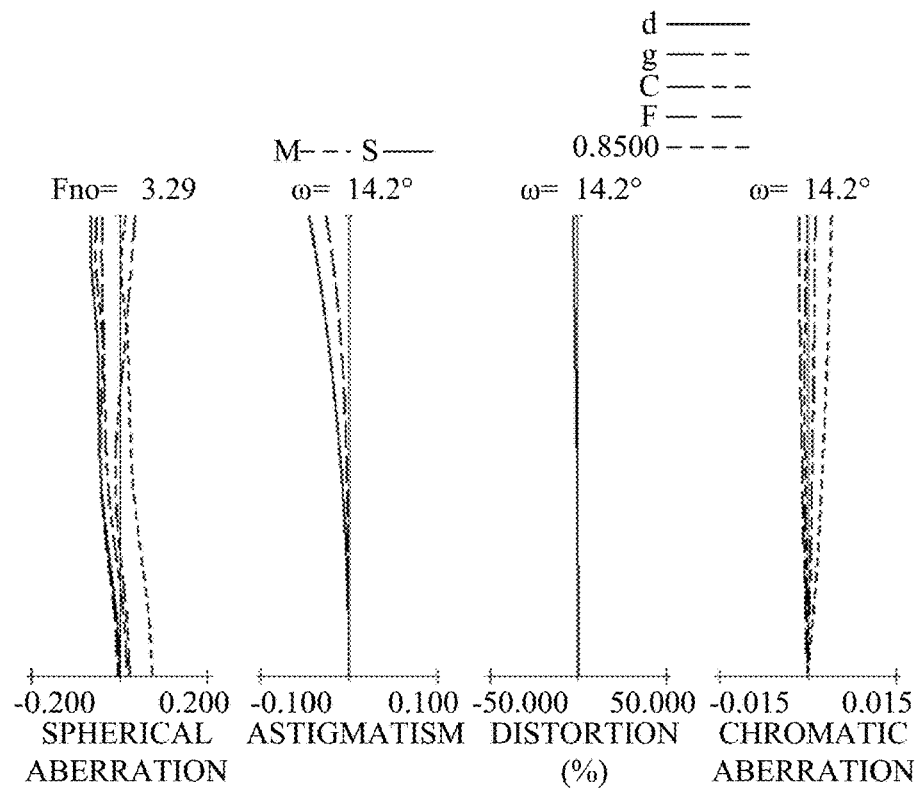
Figure 6C:
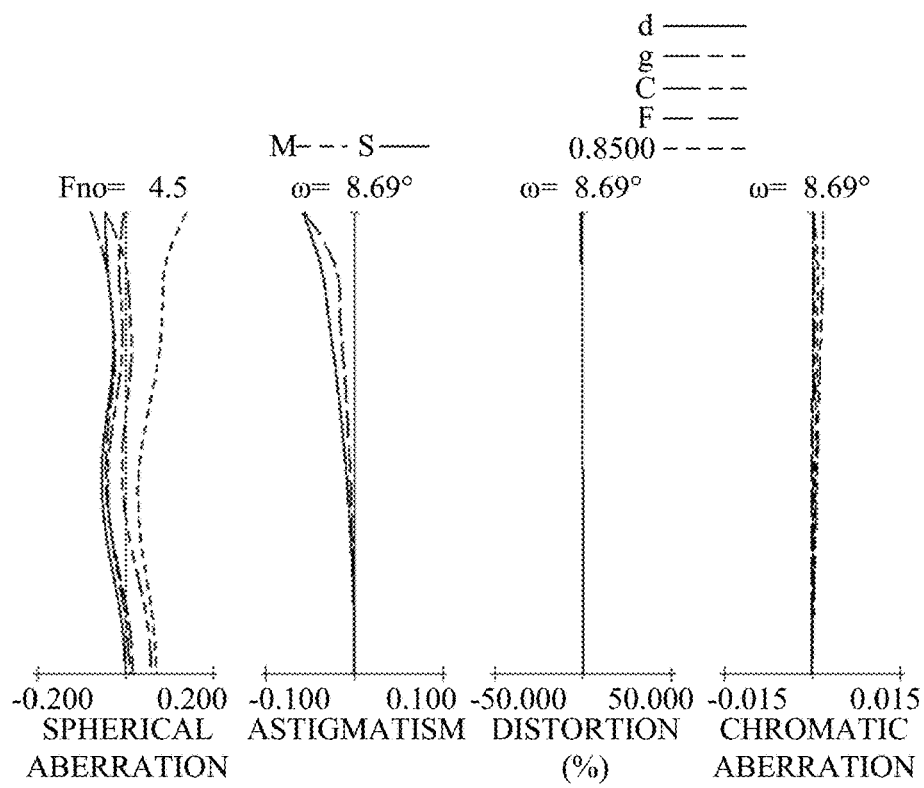
Figure 7:
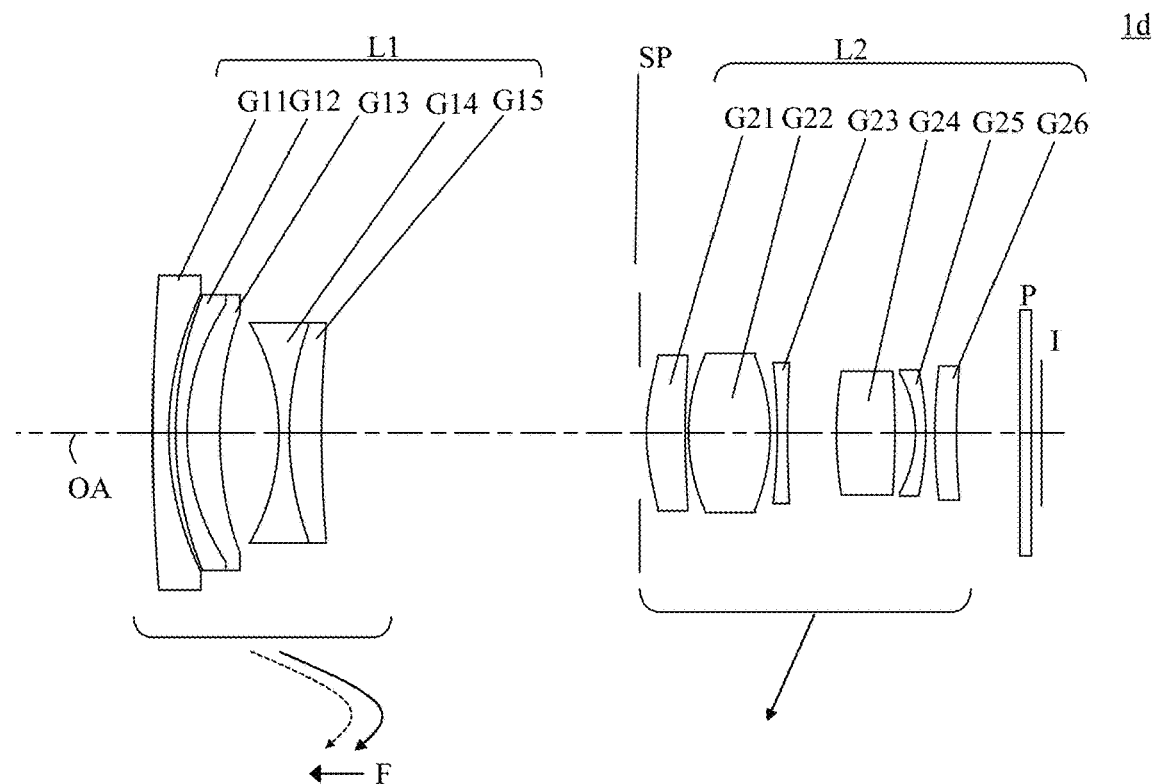
FIG. 7 is a diagram illustrating a lens section and a moving trajectory of a zoom lens at a wide-angle end according to an Example 4.
Figure 8A:
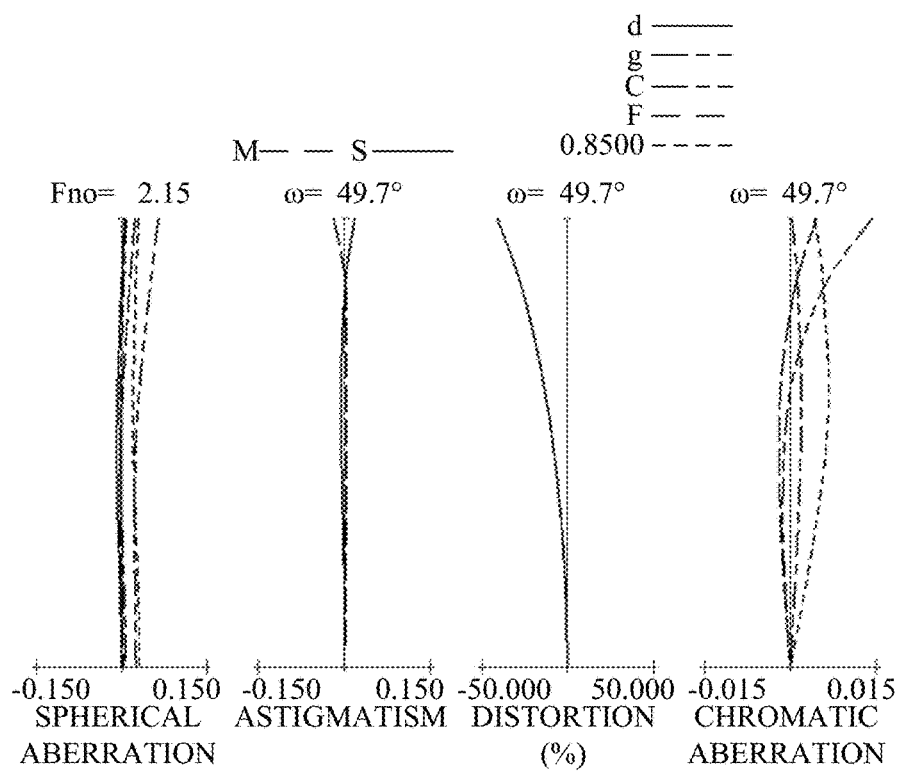
FIGS. 8A to 8C are aberration diagrams of the zoom lens at the wide-angle end, middle zoom position, and telephoto end according to the Example 4.
Figure 8B:
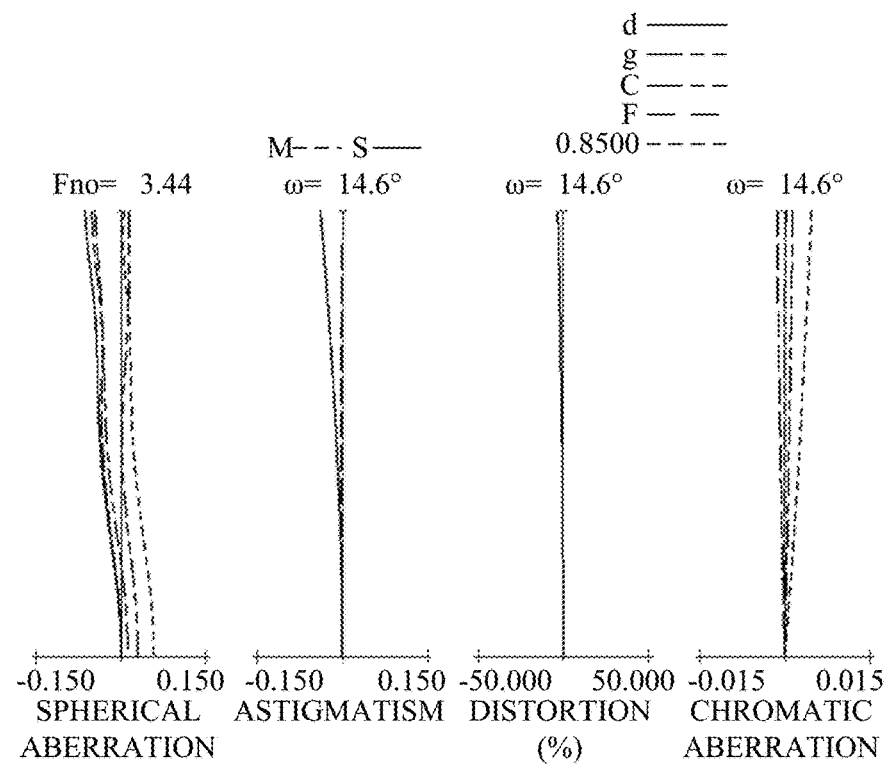
Figure 8C:
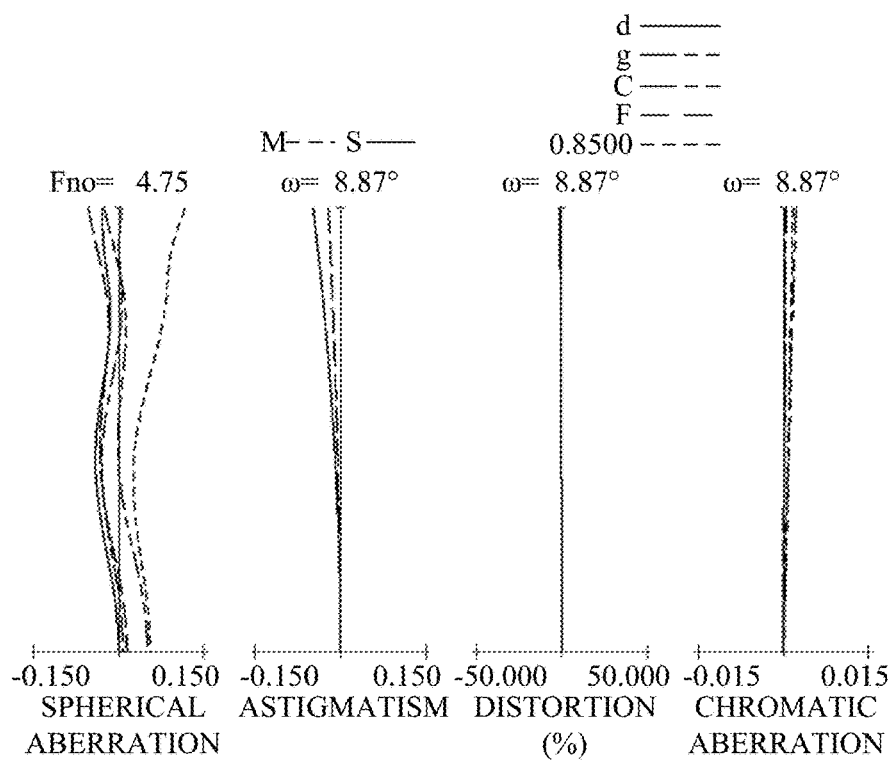
Figure 9:
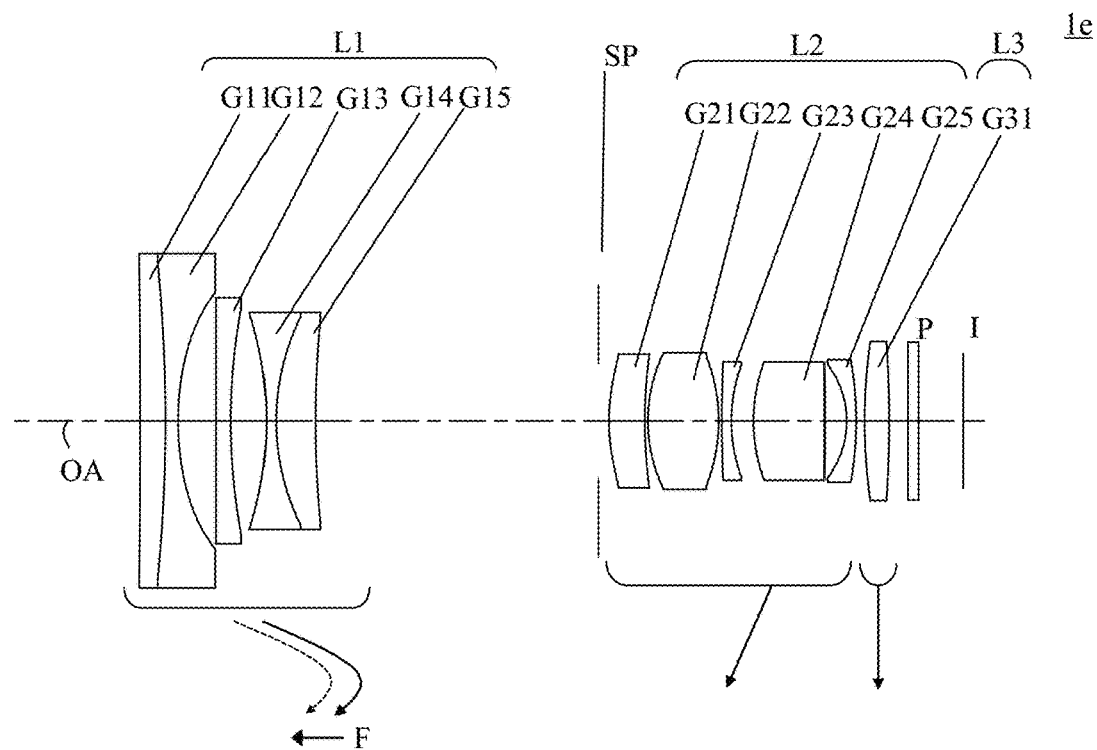
FIG. 9 is a diagram illustrating a lens section and a moving trajectory of a zoom lens at a wide-angle end according to an Example 5.
Figure 10A:
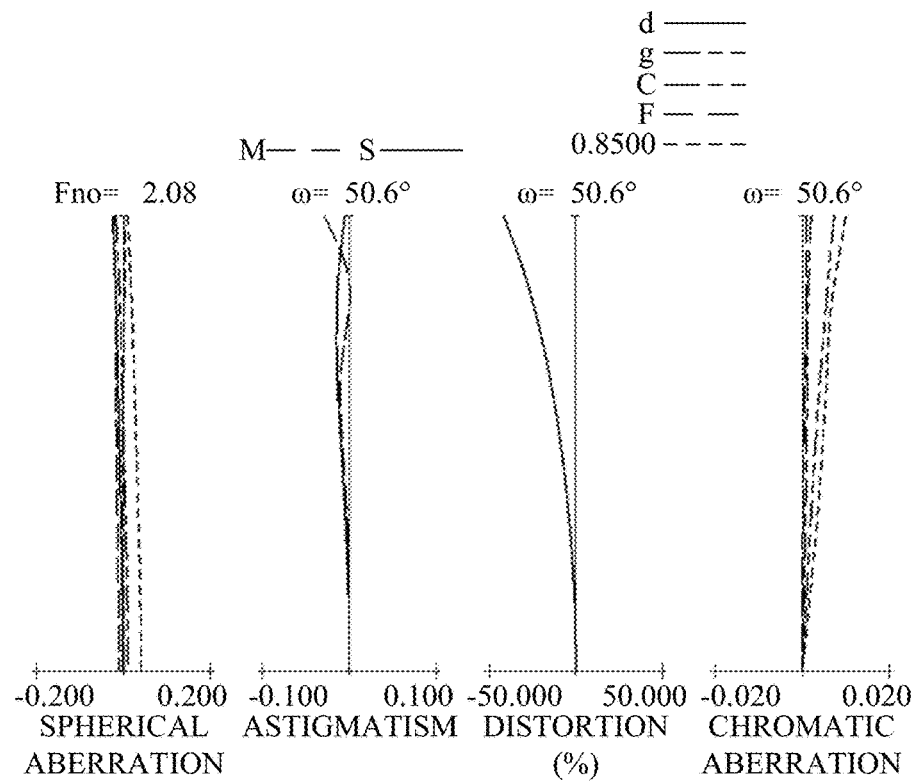
FIGS. 10A to 10C are aberration diagrams of the zoom lens at the wide-angle end, middle zoom position, and telephoto end according to the Example 5.
Figure 10B:
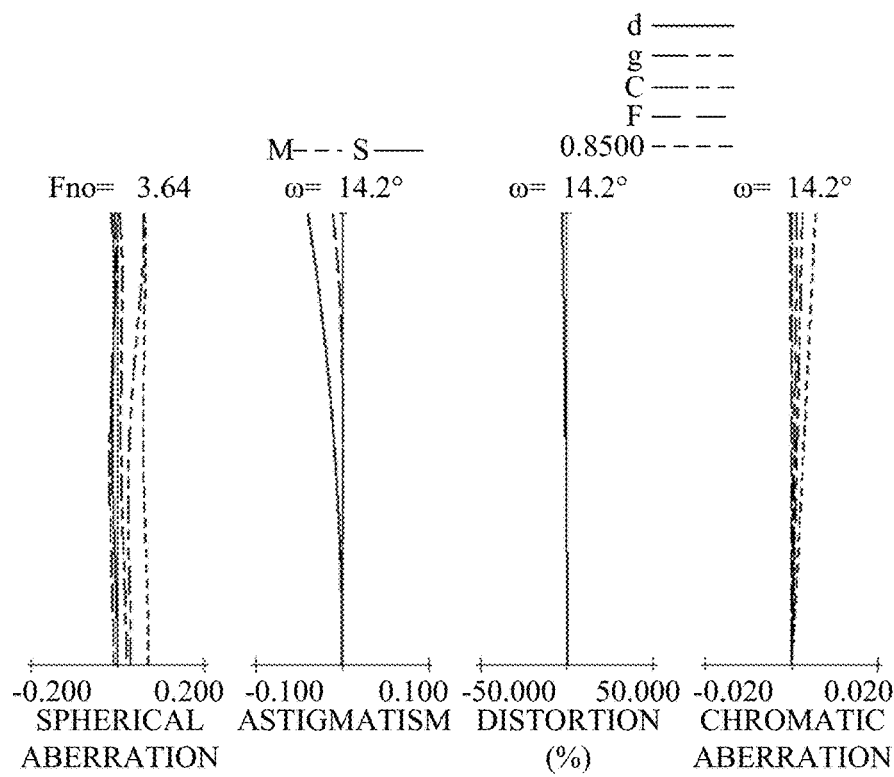
Figure 10C:
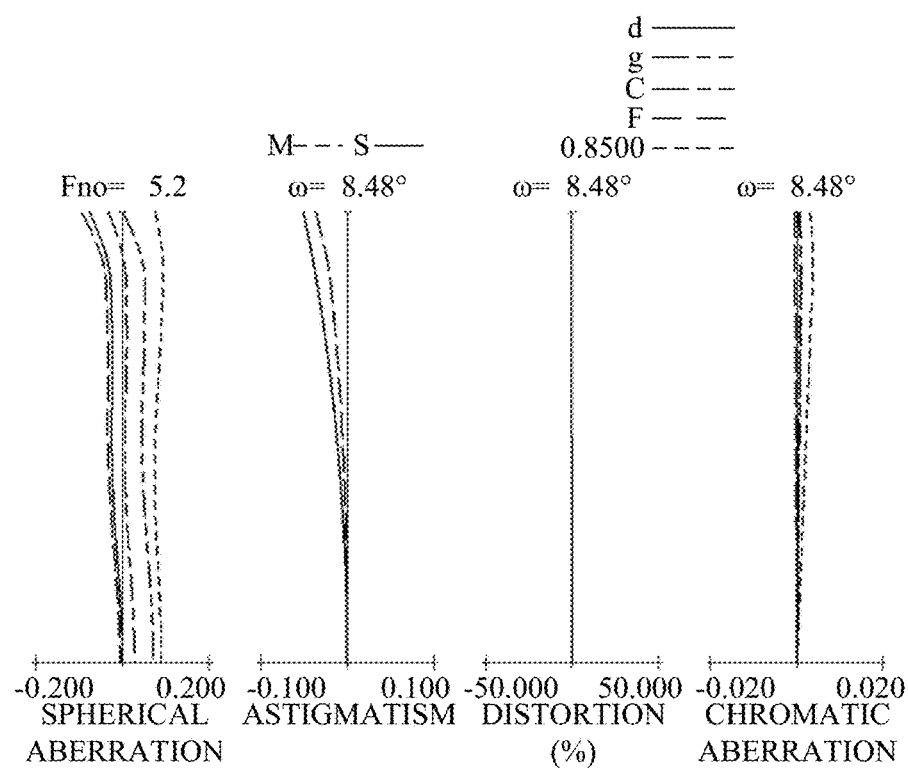
Figure 11:
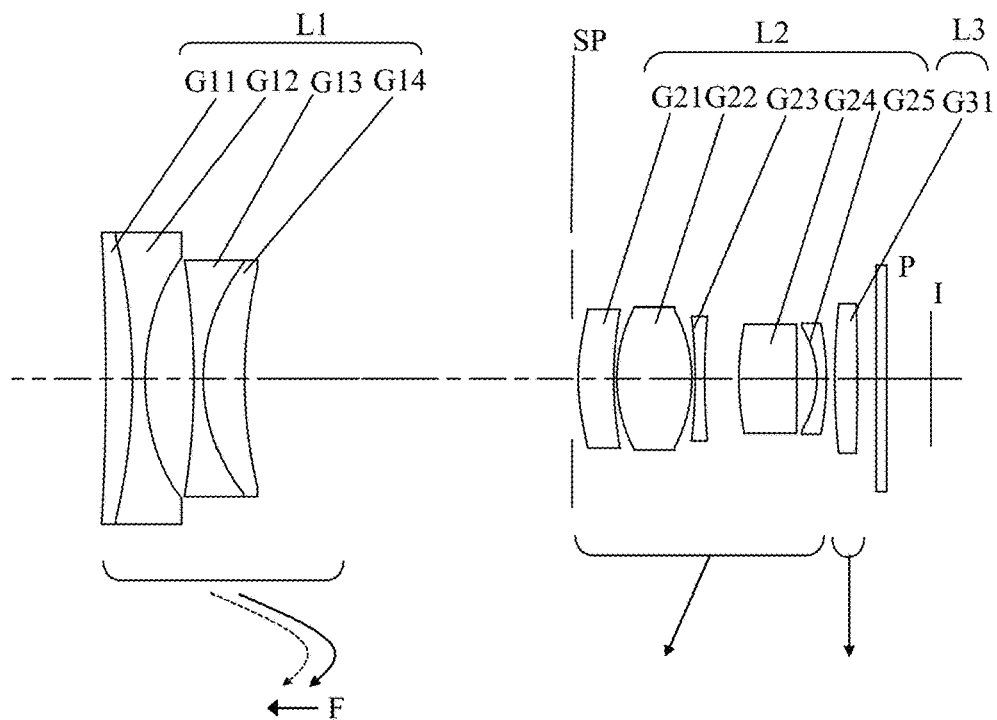
FIG. 11 is a diagram illustrating a lens section and a moving trajectory of a zoom lens at a wide-angle end according to an Example 6.

Referring now to the accompanying drawings, a detailed description will be given of embodiments according to the present disclosure.

A zoom lens according to each of Examples 1 to 5 is a small-sized and wide-angle zoom lens having high optical performance capable of correcting lateral chromatic aberration well. The zoom lens in each of the Examples 1 to 5 includes, in order from an object side to an image side, a first lens unit L1 having a negative refractive power and a second lens unit L2 having a positive refractive power, and a distance between adjacent lens units changes during zooming. The first lens unit L1 includes two cemented lenses, and each of the two cemented lenses includes a positive lens. The following inequalities (1) and (2) are satisfied:

$$1.80 < Nd1p < 2.15 \quad (1)$$

$$-1.7 < f1/f2 < -0.9 \quad (2)$$

where Ndlp represents an average refractive index of the positive lenses in the two cemented lenses of the first lens unit L1, f1 represents a focal length of the first lens unit L1, and f2 represents a focal length of the second lens unit L2.

The zoom lens in each of the Examples 1 to 5 is a negative lead type in which the negative first lens unit L1 and the positive second lens unit L2 move during zooming so that a small-sized and wide-angle zoom lens is realized. Since the negative first lens unit L1 includes at least two positive lenses and at least two sets of cemented lenses each of which includes a positive lens, lateral chromatic aberration is corrected well and the configuration is beneficial for reducing size.

The inequality (1) specifies a range of the average refractive index Ndlp of the positive lens in the first lens unit L1. If the average refractive index Ndlp is larger than the upper limit of the inequality (1), the number of selectable lens materials decreases. On the other hand, if the average refractive index Ndlp is smaller than the lower limit of the inequality (1), a curvature of a positive lens in the first lens unit L1 is so large that sizes of a positive lens and the cemented lenses including the positive lens increase.

The inequality (2) specifies a ratio of the focal length f1 of the first lens unit L1 to the focal length f2 of the second lens unit L2. If the refractive power of the first lens unit L1 is so strong for the refractive power of the second lens unit L2 that the value is larger than the upper limit of the inequality (2), lateral chromatic aberration worsens. On the other hand, if the refractive power of the first lens unit L1 is so weak for the refractive power of the second lens unit L2 that the value is smaller than the lower limit of the inequality (2), the refractive power of the second lens unit L2 increases so as to ensure high magnification variation ratio, and it is difficult to achieve both small size and wide angle.

In each of the Examples 1 to 5, the following inequality (3) may be satisfied:

$$0.40 < |1Gt/f1| < 0.90 \quad (3)$$

where 1 Gt represents a length on an optical axis of the first lens unit L1.

The inequality (3) specifies a ratio of the length 1 Gt of the first lens unit L1 to the focal length f1 of the first lens unit L1. The length 1 Gt is a distance from a lens surface closest to the object to a lens surface closest to the image plane of the first lens unit L1. If the length 1 Gt of the first lens unit L1 is so long for the refractive power of the first lens unit L1 that the value is larger than the upper limit of the inequality (3), it is difficult to reduce the size of the zoom lens (entire lens system). On the other hand, if the length 1 Gt of the first lens unit L1 is so short for the refractive power of the first lens unit L1 that the value is smaller than the lower limit of the inequality (3), proper curvatures of lenses and distances between lenses cannot be ensured in the first lens unit L1, making it difficult to correct lateral chromatic aberration.

In each of the Examples 1 to 5, at least one of the two cemented lenses in the first lens unit L1 may have a negative refractive power, and the following inequality (4) may be satisfied:

$$0.50 < f1a/f1 < 3.50 \quad (4)$$

where f1a represents a focal length of a cemented lens having the strongest refractive power in cemented lenses having negative refractive powers.

The inequality (4) specifies a ratio of the focal length f1a of the cemented lens having the largest absolute value of the refractive power in cemented lenses having negative refractive powers to the focal length f1 of the first lens unit L1. If the focal length f1a of the cemented lens having the strongest refractive power in cemented lenses having negative refractive powers is so long for the focal length f1 of the first lens unit L1 that the value is larger than the upper limit of the inequality (4), it is difficult to make the zoom lens have a wide angle. On the other hand, if the focal length f1a of the cemented lens having the strongest refractive power in cemented lenses having negative refractive powers is so short for the focal length f1 of the first lens unit L1 that the value is smaller than the lower limit of the inequality (4), it is difficult to correct lateral chromatic aberration.

In each of the Examples 1 to 5, the following inequality (5) may be satisfied:

$$0 \le |TLw - TLt|/ft < 0.30 \quad (5)$$

where TLw represents a length from a surface closest to the object to an image plane of the zoom lens at a wide-angle end, TLt represents a length from a surface closest to the object to the image plane of the zoom lens at the telephoto end, and ft represents a focal length of the zoom lens at the telephoto end.

The inequality (5) specifies a ratio of a difference between the length TLw at the wide-angle end and the length TLt at the telephoto end to the focal length ft of the zoom lens at the telephoto end. If the difference between the length TLw at the wide-angle end and the length TLt at the telephoto end is so large for the focal length ft of the zoom lens at the telephoto end that the value is larger than the upper limit of the inequality (5), it is difficult to reduce the size of the zoom lens in an entire zoom area.

In each of the Examples 1 to 5, the following inequality (6) may be satisfied:

$$0.28 < M2/TLw < 0.52 \quad (6)$$

where M2 represents a moving amount of the second lens unit L2 from the wide-angle end to the telephoto end, that is, the maximum moving amount of the second lens unit L2.

The inequality (6) specifies a ratio of the moving amount M2 of the second lens unit L to the length TLw at the wide-angle end. If the moving amount M2 of the second lens unit L2 is so large for the length TLw at the wide-angle end that the value is larger than the upper limit of the inequality (6), it is difficult to reduce the size of the zoom lens. On the other hand, if the moving amount M2 of the second lens unit L2 is so small for the length TL2 at the wide-angle end that the value is smaller than the lower limit of the inequality (6), the refractive power of the second lens unit L2 increases so as to ensure a zoom ratio and variation in lateral chromatic aberration greatly increases.

In each of the Examples 1 to 5, the second lens unit L2 may include at least one positive lens, and the following inequality (7) may be satisfied:

$$35 < vd2p < 60 \quad (7)$$

where vd2p represents an average Abbe number of the positive lens in the second lens unit L2.

The inequality (7) specifies a range of the average Abbe number vd2p of the positive lens in the second lens unit L2. If the average Abbe number vd2p of the positive lens in the second lens unit L2 is larger than the upper limit of the inequality (7), lateral chromatic aberration is excessively corrected in the entire zoom area. On the other hand, if the average Abbe number vd2p of the positive lens in the second lens unit L2 is smaller than the lower limit of the inequality (7), lateral chromatic aberration is insufficiently corrected in the entire zoom area.

In each of the Examples 1 to 5, the following inequality (8) may be satisfied:

$$0.30 < bfw/f2 < 0.50 \quad (8)$$

where bfw represents a back focus at the wide-angle end, the back focus being a distance from a lens surface closest to the image plane to the image plane.

The inequality (8) specifies a ratio of the back focus bfw at the wide-angle end to the focal length f2 of the second lens unit L2. If the back focus bfw at the wide-angle end is so long for the focal length f2 of the second lens unit L2 that the value is larger than the upper limit of the inequality (8), it is difficult to reduce the size of the zoom lens. On the other hand, if the back focus bfw at the wide-angle end is so short for the focal length f2 of the second lens unit L2 that the value is smaller than the lower limit of the inequality (8), the refractive power of the first lens unit L1 decreases, making it difficult for the zoom lens to have a wide angle.

The zoom lens in each of the Examples 1 to 5 may include the first lens unit L1 and the second lens unit L2, and during zooming from the wide-angle end to the telephoto end, the second lens unit L2 may move monotonously to the object side, and the first lens unit L1 may move to the image side and thereafter move to the object side. The zoom lens in each of the Examples 1 to 5 may include a third lens unit L3 having a positive refractive power and disposed on the image side of the second lens unit. In that case, during zooming from the wide-angle end to the telephoto end, the second lens unit L2 may move monotonously to the object side, the first lens unit L1 may move to the image side and thereafter move to the object side, and the third lens unit L3 may not move, or may be fixed. The zoom lens in each of the Examples 1 to 5 may include a diaphragm SP. In that case, during zooming from the wide-angle end to the telephoto end, the diaphragm SP may move with the second lens unit L2, i.e., may move integrally with the second lens unit L2.

In each of the Examples 1 to 5, the numerical ranges of the inequalities (1) to (8) may be set to numerical ranges of the following inequalities (1a) to (8a), respectively.

$$1.81 < Nd1p < 2.11 \quad (1a)$$
$$-1.6 < f1/f2 < -1.0 \quad (2a)$$
$$0.45 < |1Gt/f1| < 0.85 \quad (3a)$$
$$0.58 < f1a/f1 < 3.30 \quad (4a)$$
$$0 \le |TLw - TLt|/ft < 0.23 \quad (5a)$$
$$0.31 < M2/TLw < 0.48 \quad (6a)$$
$$40 < vd2p < 58 \quad (7a)$$
$$0.33 < bfw/f2 < 0.48 \quad (8a)$$

In each of the Examples 1 to 5, the numerical ranges of the inequalities (1a) to (8a) may be set to numerical ranges of the following inequalities (1b) to (8b), respectively.

$$1.81 < Nd1p < 2.07 \quad (1b)$$
$$-1.5 < f1/f2 < -1.1 \quad (2b)$$
$$0.50 < |1Gt/f1| < 0.80 \quad (3b)$$
$$0.66 < f1a/f1 < 3.10 \quad (4b)$$
$$0 \le |TLw - TLt|/ft < 0.16 \quad (5b)$$
$$0.34 < M2/TLw < 0.44 \quad (6b)$$
$$45 < vd2p < 56 \quad (7b)$$
$$0.36 < bfw/f2 < 0.46 \quad (8b)$$

According to each of the Examples 1 to 5, by configuring each element as described above, it is possible to acquire a small-sized and wide-angle zoom lens having high optical performance capable of correcting lateral chromatic aberration well. The effect of the present disclosure can be further enhanced by arbitrarily combining the plurality of above-mentioned inequalities.

The zoom lens in each of the Examples 1 to 5 is an image pickup lens system used in an image pickup apparatus such as a digital still camera, a video camera, a silver-halide film camera, a TV camera, and a monitoring camera. FIGS. 1, 3, 5, 7, and 9 are diagrams illustrating lens sections and moving trajectories of the zoom lenses at wide-angle ends of the Examples 1 to 5, respectively. In each drawing, the left side is the object side and the right side is the image side. L1 represents the first lens unit having the negative refractive power, L2 represents the second lens unit having the positive refractive power, and L3 represents the third lens unit having the positive refractive power.

In each of the Examples 1 to 5, the first lens unit L1 includes two sets of cemented lenses each of which includes a negative lens and a positive lens. In each of the Examples 1 to 3, the first lens unit L1 includes two sets of cemented lenses each of which includes a negative lens and a positive lens. In each of the Examples 4 and 5, the first lens unit L1 includes a single negative lens in addition to two sets of cemented lenses each of which includes a negative lens and a positive lens.

In each drawing, P represents an optical block corresponding to an optical filter, a face plate, a low-pass filter, an infrared cut filter, or the like. SP represents a diaphragm. I represents the image plane. When the zoom lens is used as an image pickup optical system for a digital still camera or a video camera, the image plane I corresponds to an image sensor (also referred to as an image pickup element), which is a photoelectric conversion element, such as a CCD sensor and a CMOS sensor. When the zoom lens is used as an image pickup optical system for a silver-halide film camera, the image plane I corresponds to a film surface. Arrows in each drawing represent moving trajectories of lens units during zooming.

In each of the Examples 1 to 5, the diaphragm SP is disposed between the first lens unit L1 and the second lens unit L2, or on a position closest to the object in the second lens unit L2. An aperture diameter of the diaphragm SP may be constant or variable during zooming. When the aperture diameter of the diaphragm SP is changed, it is possible to cut lower ray coma flare caused by an off-axis light beam which greatly occurs at the telephoto end, and hence better optical performance can be acquired.

Focusing is performed by moving the first lens unit L1 on an optical axis OA. Among the moving trajectories of the first lens unit L1 illustrated in each drawing, a solid curved line represents a moving trajectory for correcting an image plane variation during focusing on an object at infinity, the image plane variation being caused by zooming from the wide-angle end to the telephoto end. A dotted curved line represents a moving trajectory for correcting an image plane variation during focusing on the object at close distance, the image plane variation being caused by zooming from the wide-angle end to the telephoto end. In each of the Examples 1 to 5, focusing may be performed by moving the second lens unit L2 on the optical axis OA instead of the first lens unit L1.

In each of the zoom lenses 1a and 1b according to the Examples 1 and 2 (FIGS. 1 and 3), the first lens unit L1 includes lenses G11, G12, G13 and G14, the second lens unit L2 includes lenses G21, G22, G23, G24 and G25, and the third lens unit L3 includes a lens L31. In each of the zoom lenses 1a and 1b, the first lens unit L1 includes a cemented lens of the positive lens G11 and the negative lens G12, and a cemented lens of the negative lens G13 and the positive lens G14.

In a zoom lens 1c in the Example 3 (FIG. 5), the first lens unit L1 includes lenses G11, G12, G13 and G14, and the second lens unit L2 includes lenses G21, G22, G23, G24, G25 and G26. In the zoom lens 1c, the first lens unit L1 includes a cemented lens of the negative lens G11 and the positive lens G12, and a cemented lens of the negative lens G13 and the positive lens G14.

In a zoom lens 1d in the Example 4 (FIG. 7), the first lens unit L1 includes lenses G11, G12, G13, G14 and G15, and the second lens unit L2 includes lenses G21, G22, G23, G24, G25 and G26. In the zoom lens 1d, the first lens unit L1 includes the negative lens G11, a cemented lens of the negative lens G12 and the positive lens G13, and a cemented lens of the negative lens G14 and the positive lens G15.

In a zoom lens 1e in the Example 5 (FIG. 9), the first lens unit L1 includes lenses G11, G12, G13, G14 and G15, the second lens unit L2 includes lenses G21, G22, G23, G24 and G25, and the third unit L3 includes a lens G31. In the zoom lens 1e, the first lens unit L1 includes a cemented lens of the positive lens G11 and the negative lens G12, the negative lens G13, and a cemented lens of the negative lens G14 and the positive lens G15.

FIGS. 2A to 2C, 4A to 4C, 6A to 6C, 8A to 8C, and 10A to 10C are aberration diagrams of the zoom lenses in the Examples 1 to 5 at (A) wide-angle ends, (B) middle zoom positions, and (C) telephoto ends. In each spherical aberration diagram, Fno represents an F-number. A solid line represents the d-line (wavelength 587.56 nm), a two-dot chain line represents the g-line (wavelength 435.84 nm), a dot-dash-dot line represents the C-line (656.27 nm), a broken line represents the F-line (wavelength 486.13 nm), and a dotted line represents the infrared light (wavelength 850.00 nm). In each astigmatism diagram, a solid line represents a sagittal image plane in the d-line, and a dotted line represents a meridional image plane in the d-line. Each distortion diagram indicates an amount of distortion for the d-line. Each lateral chromatic aberration diagram indicates aberration in the g-line, C-line, F-line, and the infrared light (wavelength 850.00 nm) with respect to the d-line. represents an image-pickup half angle of view.

FIGS. 11, 13, 15, 17, and 19 are diagrams illustrating lens sections and moving trajectories of zoom lenses at wide-angle ends according to Examples 6 to 10, respectively. The zoom lens in each of the Examples 6 to 10 is used in an image pickup apparatus such as a digital video camera, a digital still camera, a broadcast camera, a silver halide film camera, and a monitoring camera.

In each sectional view, the left side is an object side and the right side is an image side. The zoom lens in each of the Examples 6 to 10 includes a plurality of lens units. In this specification, a lens unit is a group of lenses that integrally move or stop during zooming or focusing. That is, in the zoom lens in each of the Examples 6 to 10, the distance between adjacent lens units changes during zooming or focusing. Arrows illustrated in each sectional view represent moving directions of the lens units during zooming and focusing. The lens unit may include a single lens or may include a plurality of lenses. The lens unit may include a diaphragm.

In each sectional view, Li represents an i-th lens unit (i is a natural number) counted from the object side among the lens units in the zoom lens.

SP represents a diaphragm. I represents an image plane, and when the zoom lens in each of the Examples 6 to 10 is used as an image pickup optical system for a digital still camera or a digital video camera, as the image plane I, an image plane is disposed of a solid-state image sensor, which is a photoelectric conversion element, such as a CCD sensor and a CMOS sensor. When the zoom lens in each of the Examples 6 to 10 is used as an image pickup optical system for a silver halide film camera, as the image plane IP, a photosensitive surface corresponding to a film surface is disposed. P represents an optical block corresponding to an optical filter, a face plate, a low-pass filter, an infrared cut filter, or the like.

Figure 12A:
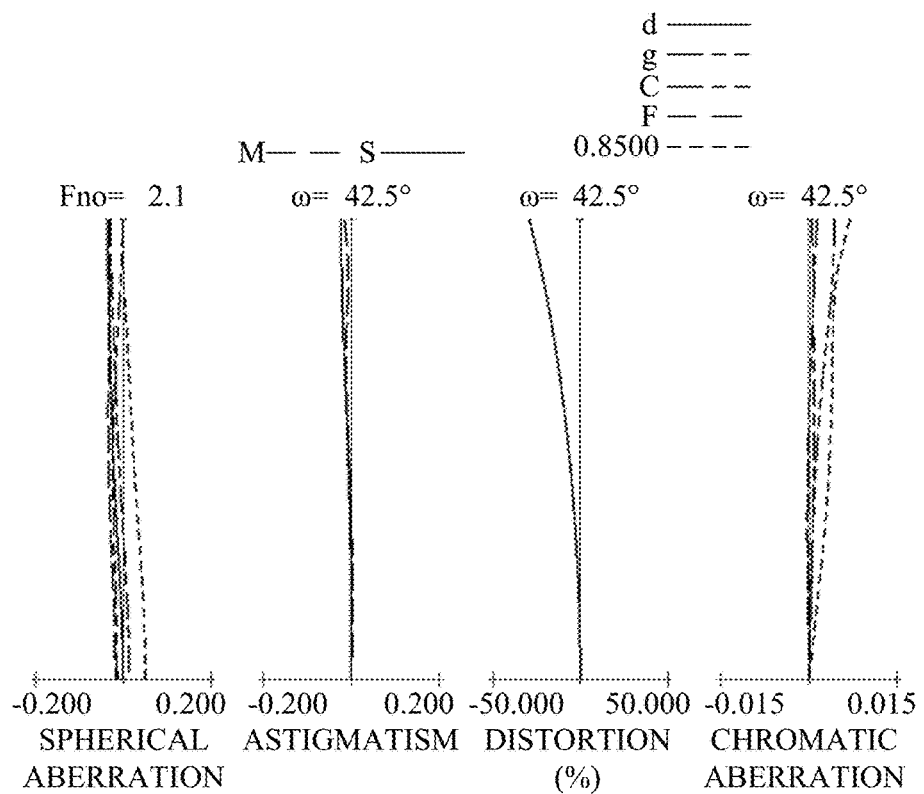
FIGS. 12A to 12C are aberration diagrams of the zoom lens at the wide-angle end, middle zoom position, and telephoto end according to the Example 6.
Figure 12B:
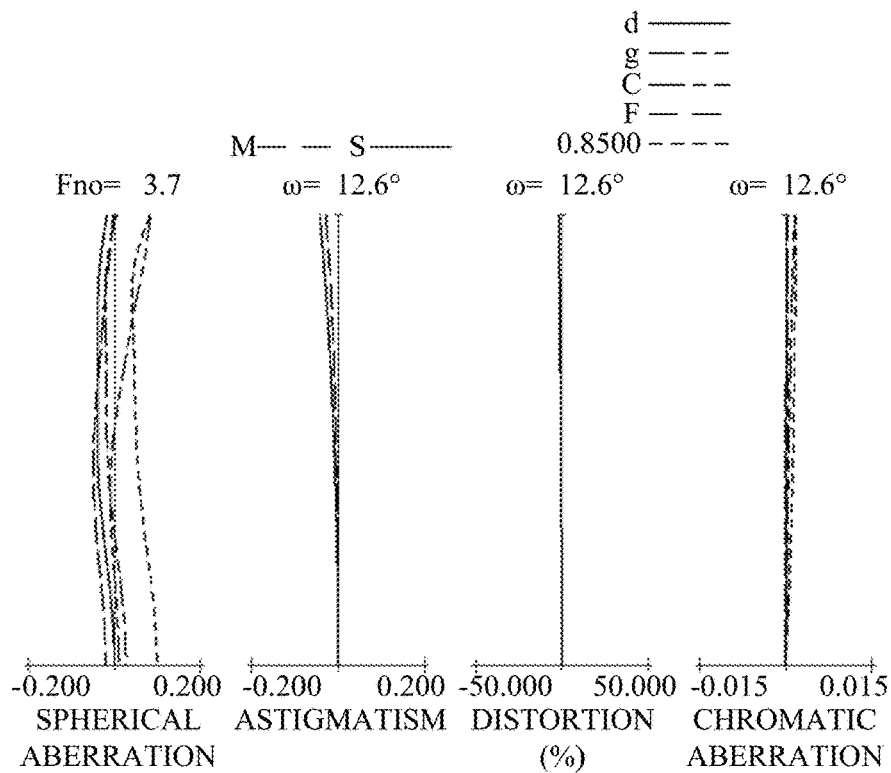
Figure 12C:
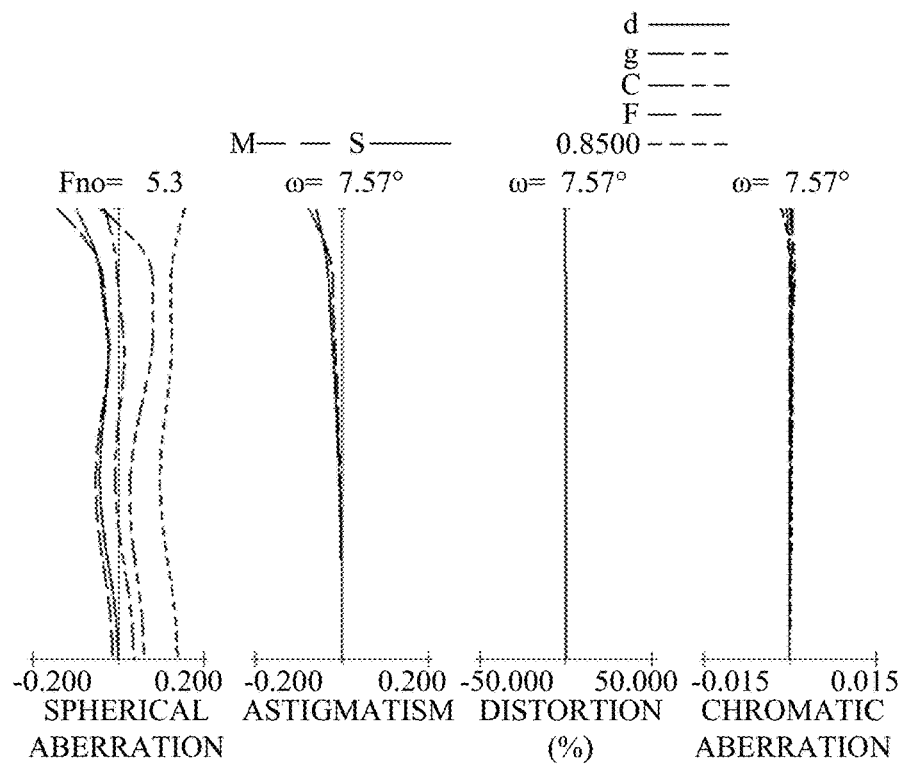
Figure 13:
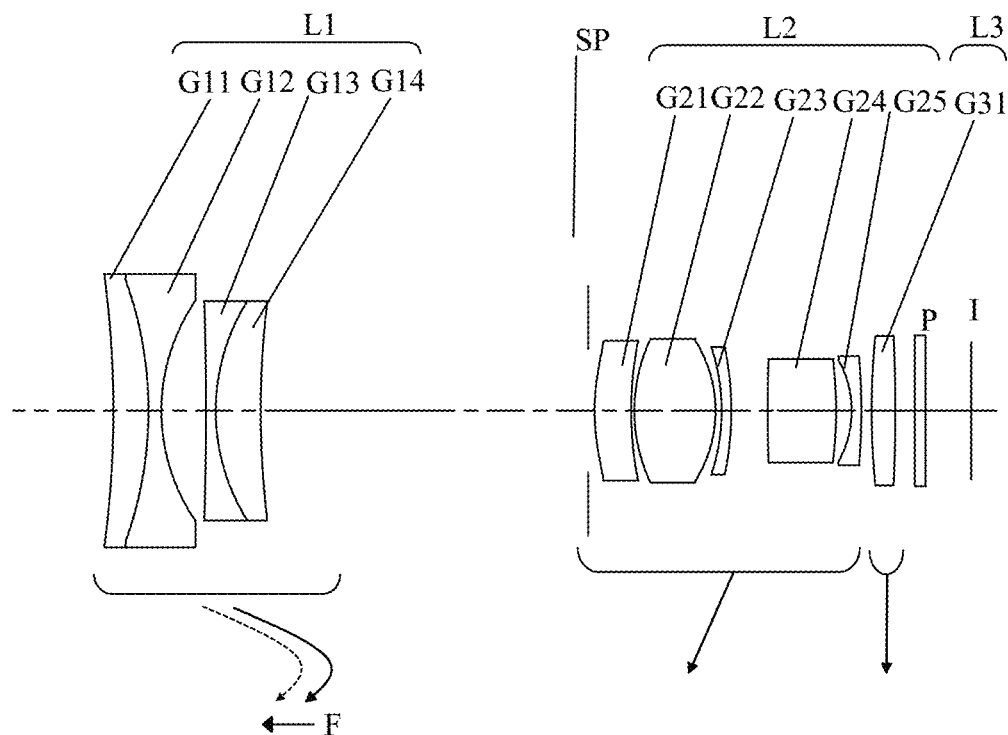
FIG. 13 is a diagram illustrating a lens section and a moving trajectory of a zoom lens at a wide-angle end according to an Example 7.
Figure 14A:
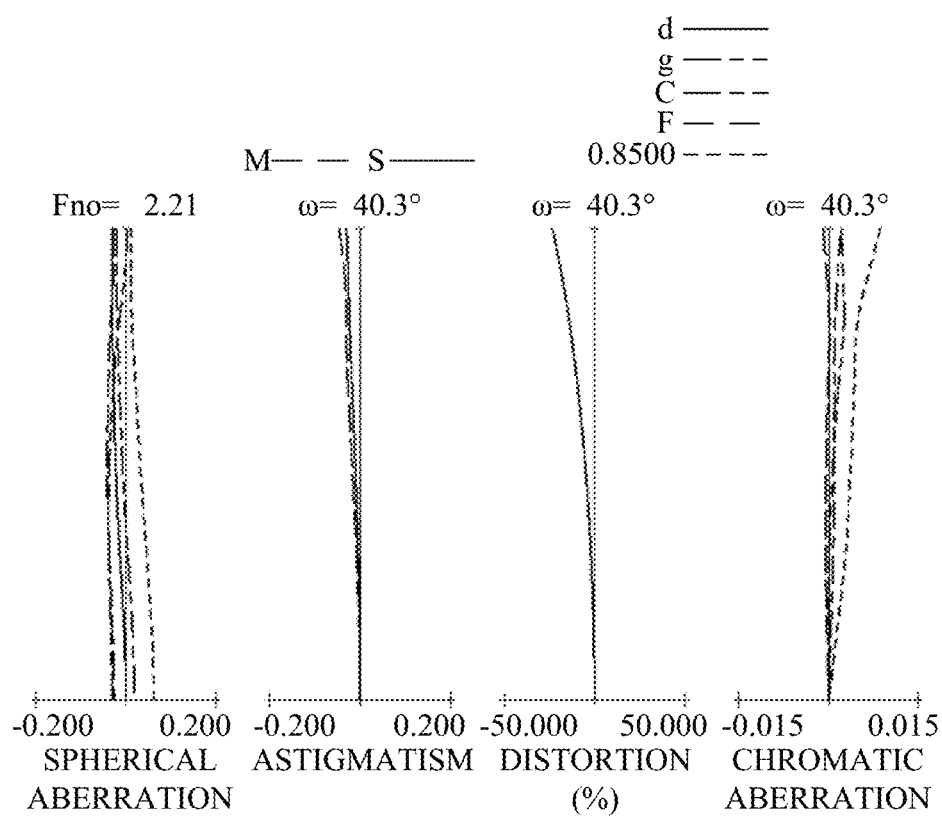
FIGS. 14A to 14C are aberration diagrams of the zoom lens at the wide-angle end, middle zoom position, and telephoto end according to the Example 7.
Figure 14B:
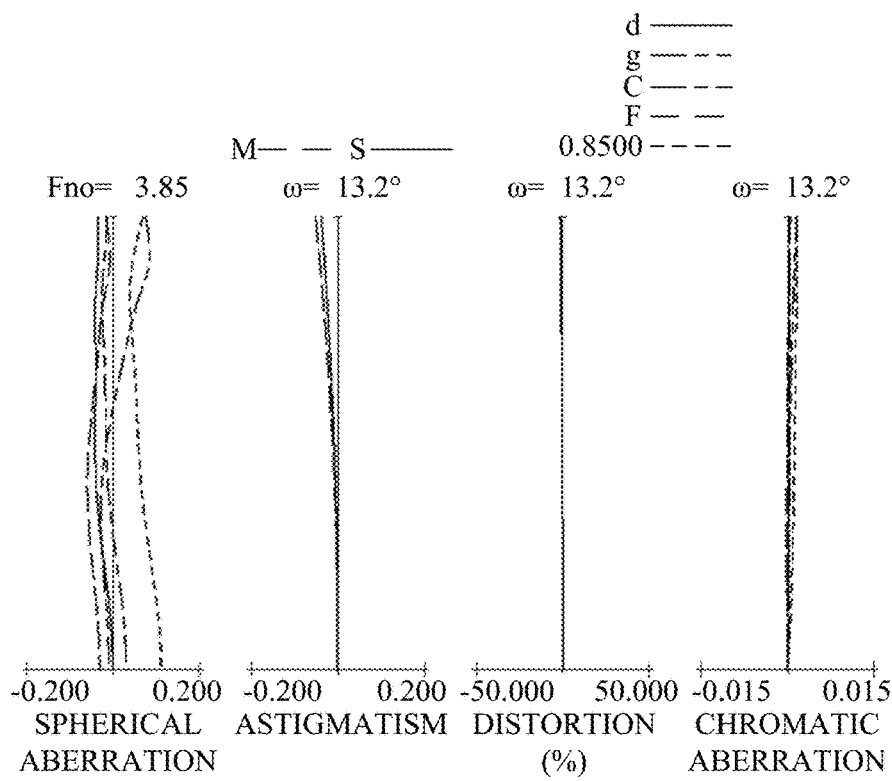
Figure 14C:
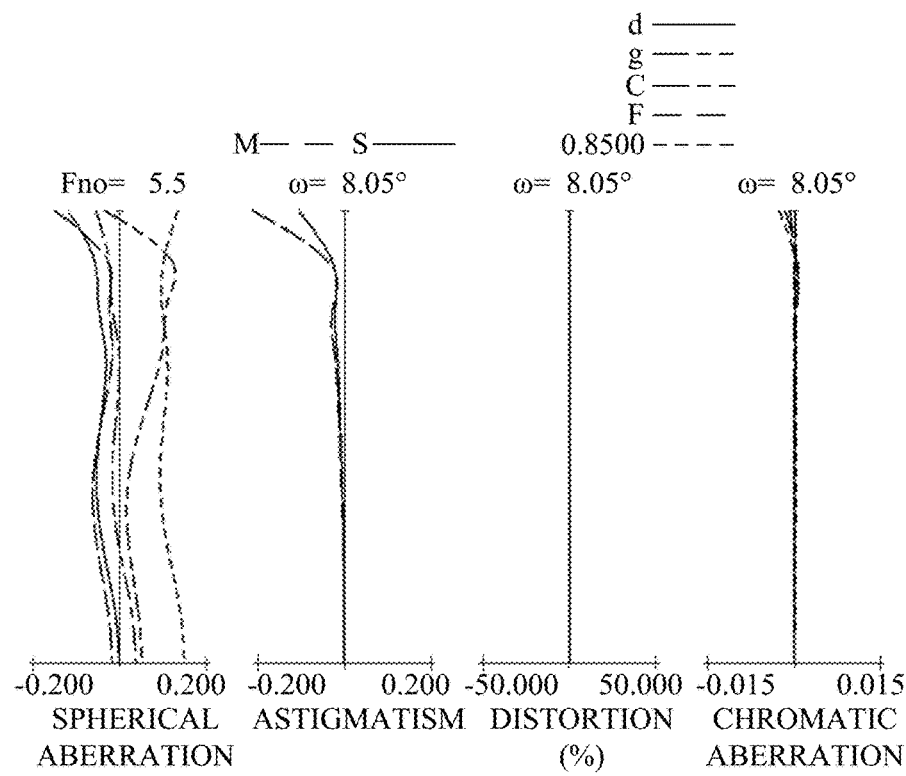
Figure 15:
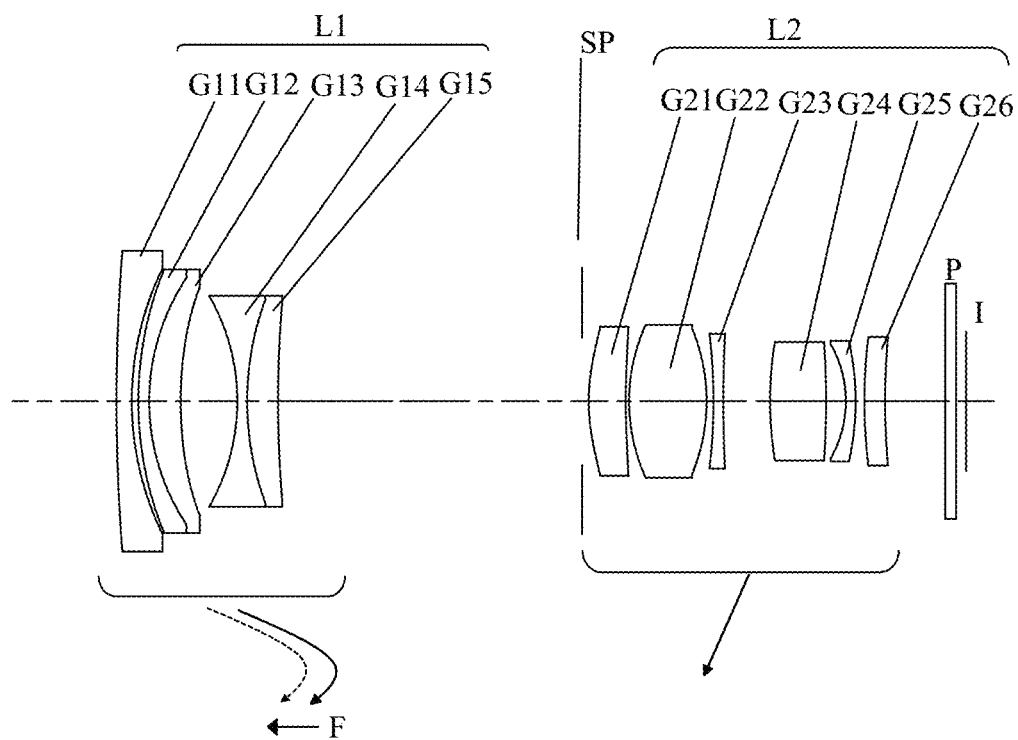
FIG. 15 is a diagram illustrating a lens section and a moving trajectory of a zoom lens at a wide-angle end according to an Example 8.
Figure 16A:
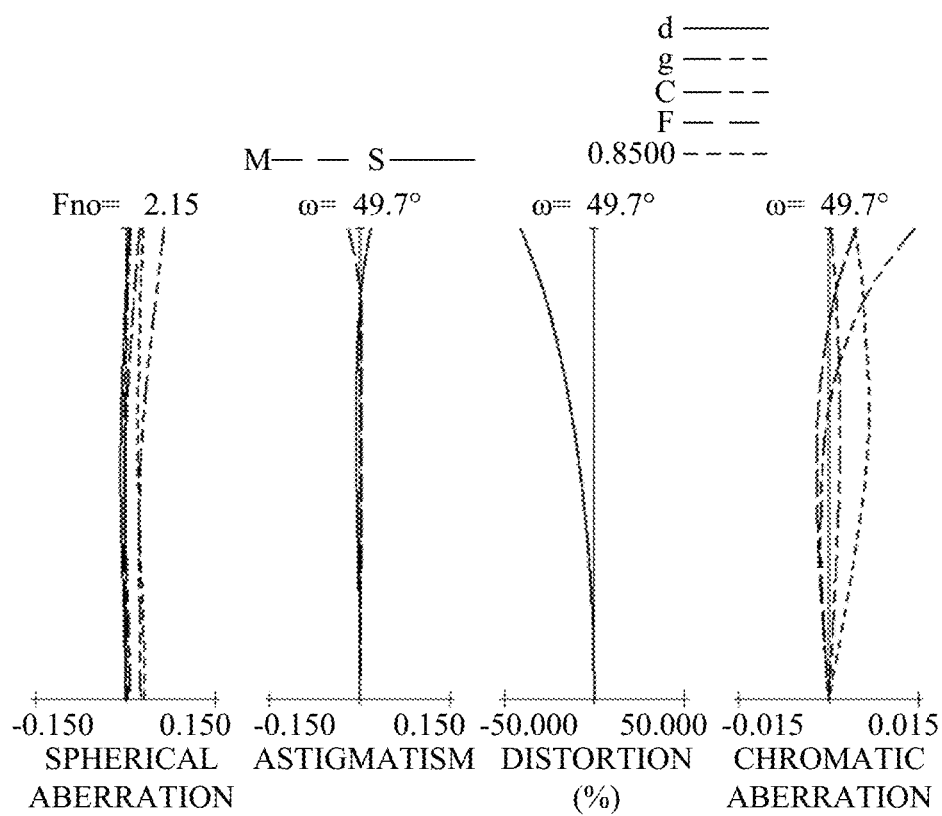
FIGS. 16A to 16C are aberration diagrams of the zoom lens at the wide-angle end, middle zoom position, and telephoto end according to the Example 8.
Figure 16B:
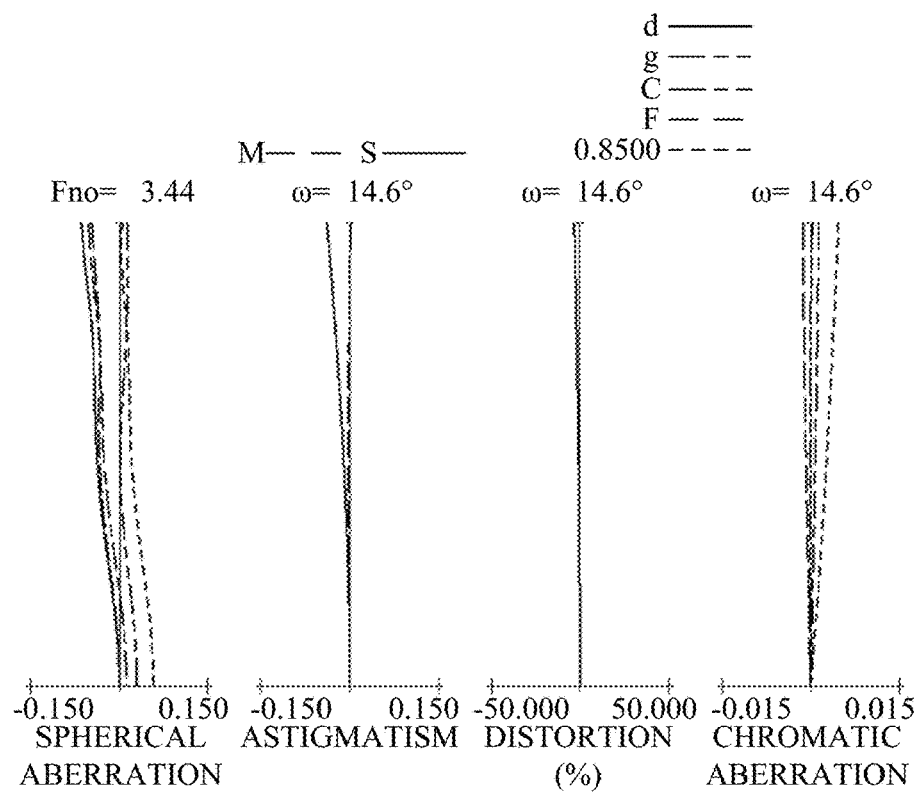
Figure 16C:
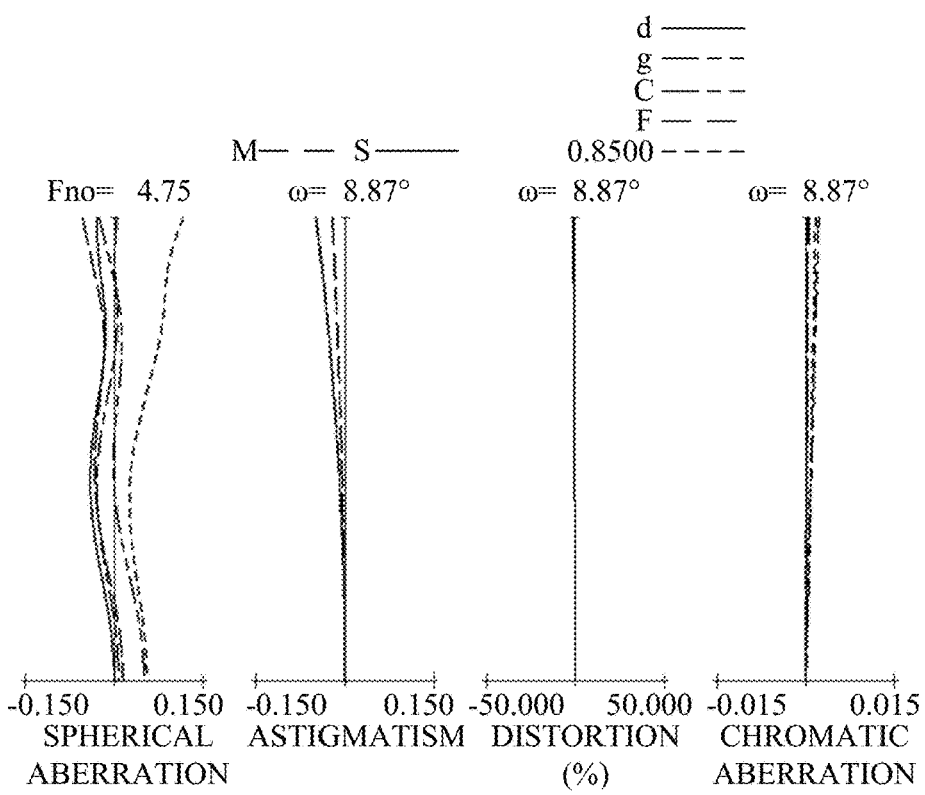
Figure 17:
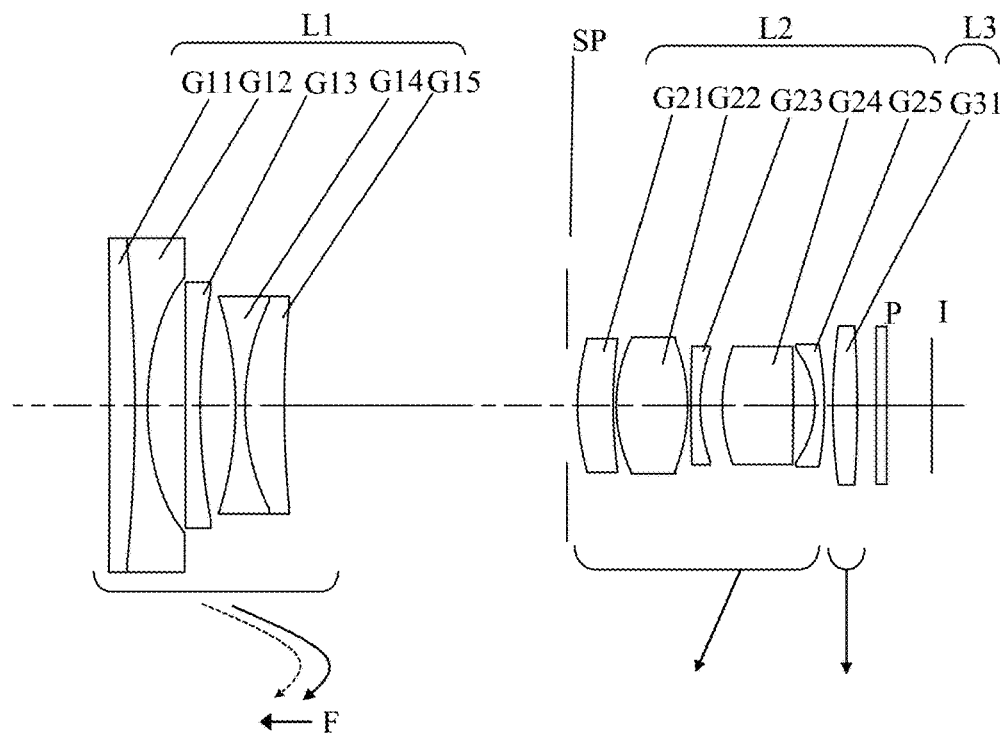
FIG. 17 is a diagram illustrating a lens section and a moving trajectory of a zoom lens at a wide-angle end according to an Example 9.
Figure 18A:
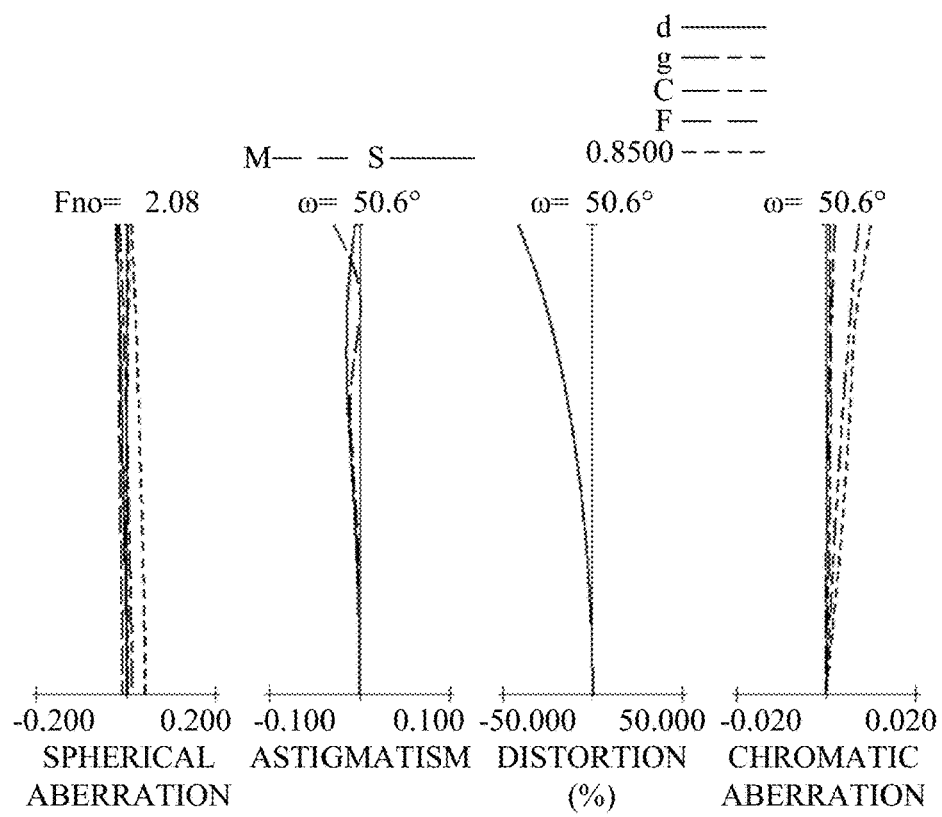
FIGS. 18A to 18C are aberration diagrams of the zoom lens at the wide-angle end, middle zoom position, and telephoto end according to the Example 9.
Figure 18B:
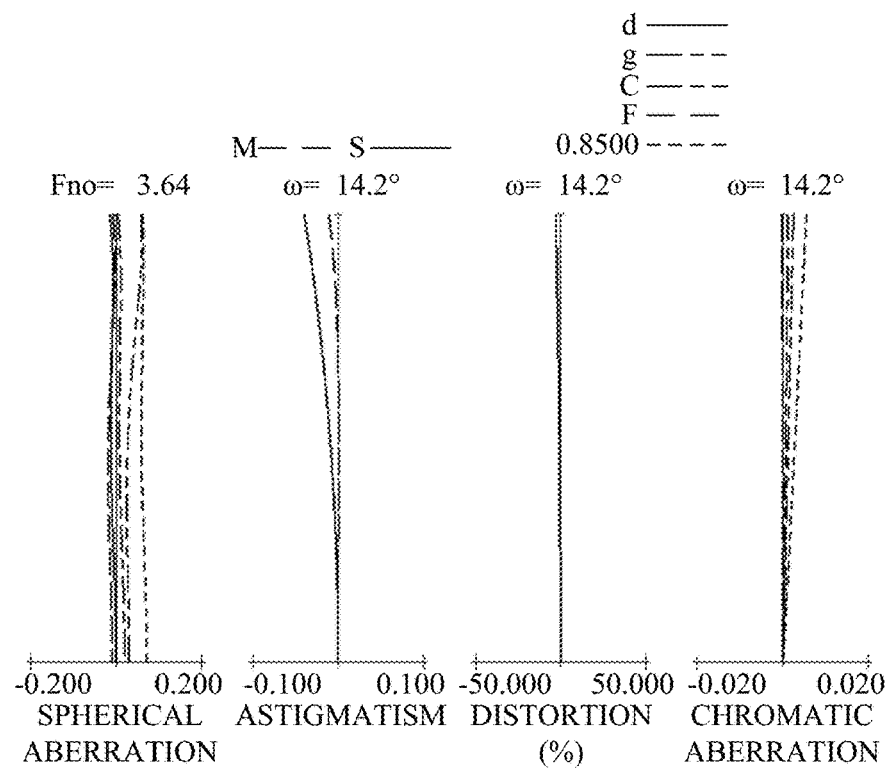
Figure 18C:
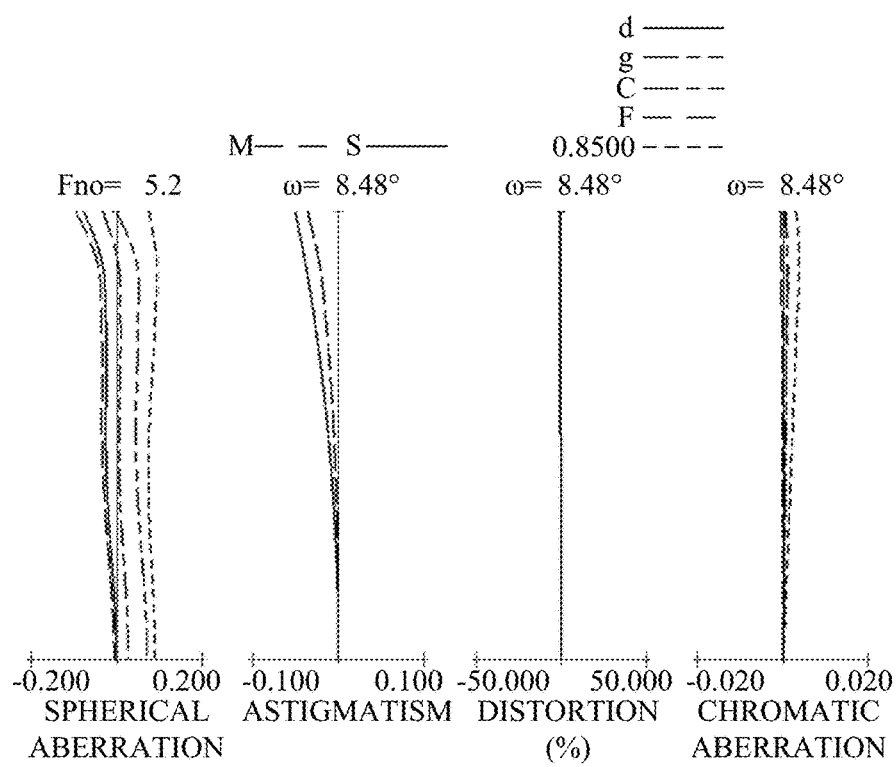
Figure 19:
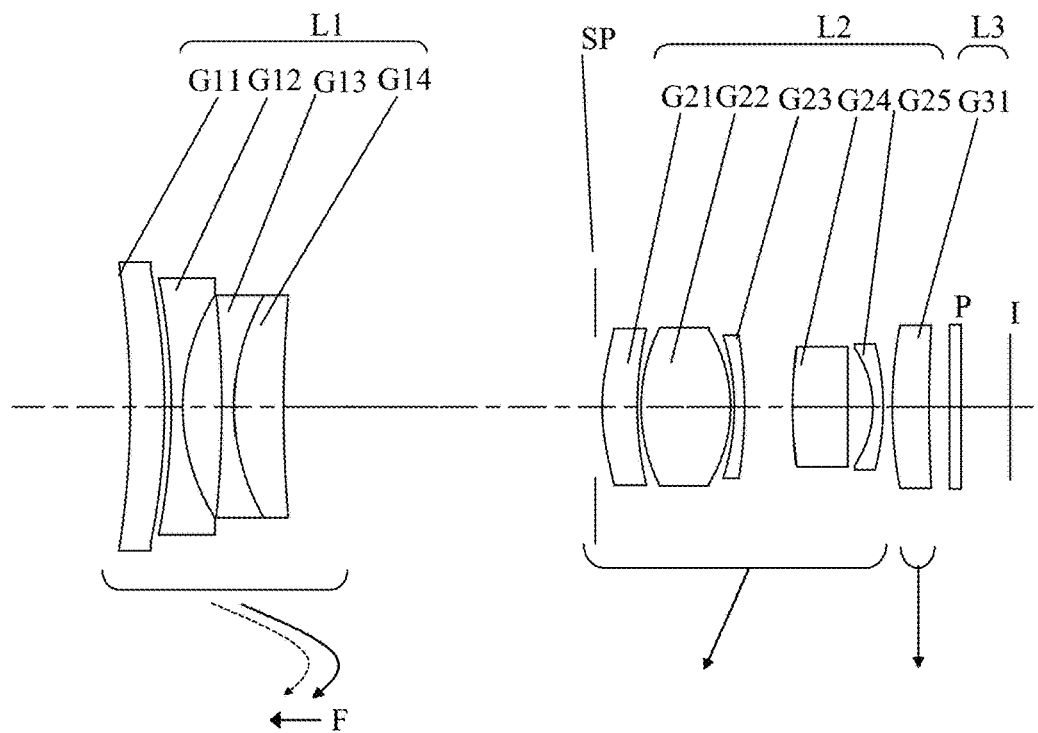
FIG. 19 is a diagram illustrating a lens section and a moving trajectory of a zoom lens at a wide-angle end according to an Example 10.
Figure 20A:
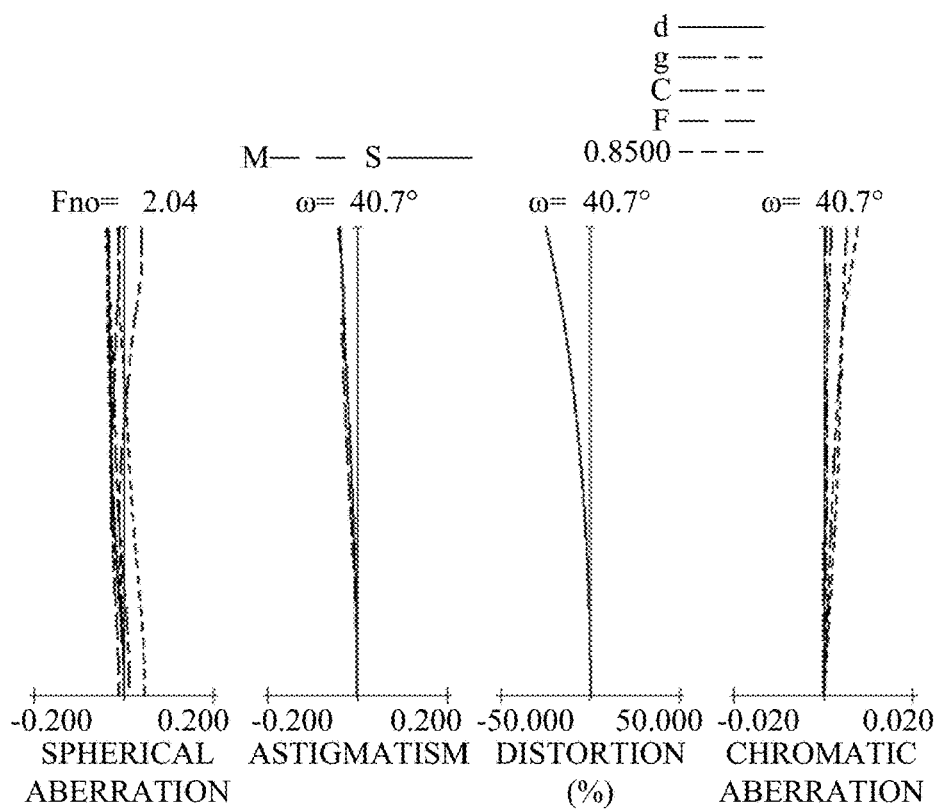
FIGS. 20A to 20C are aberration diagrams of the zoom lens at the wide-angle end, middle zoom position, and telephoto end according to the Example 10.
Figure 20B:
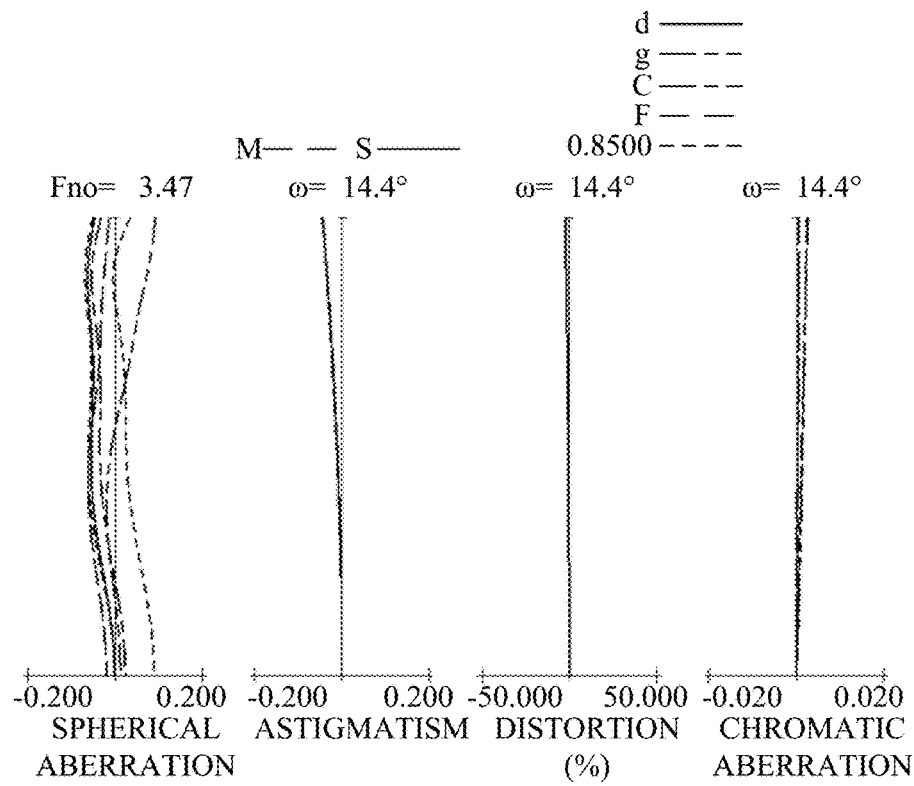
Figure 20C:
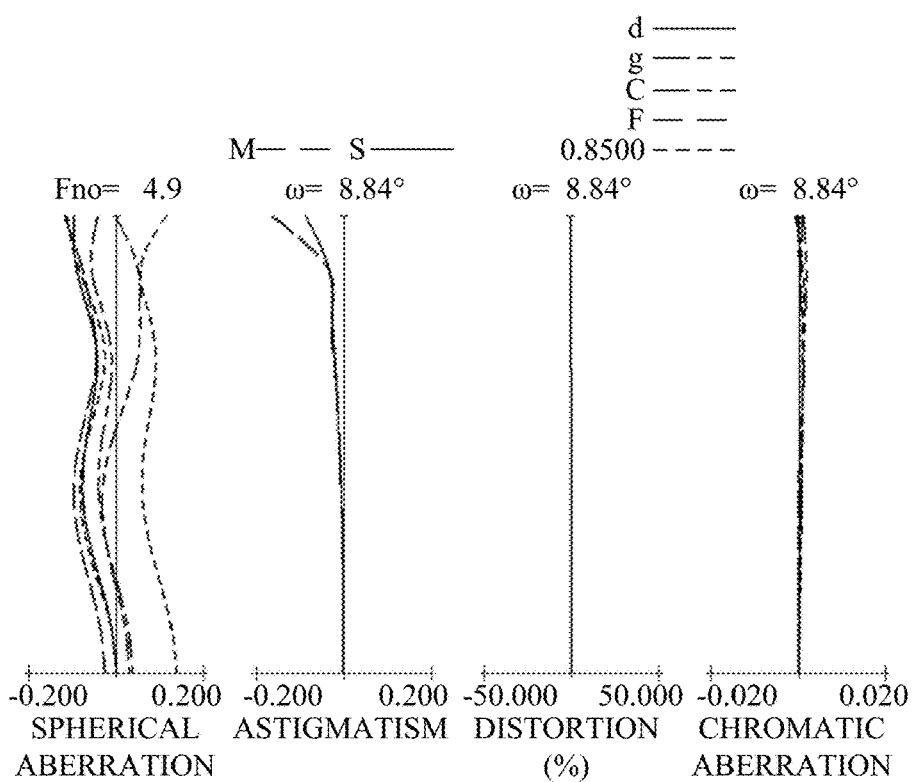
Figure 21:
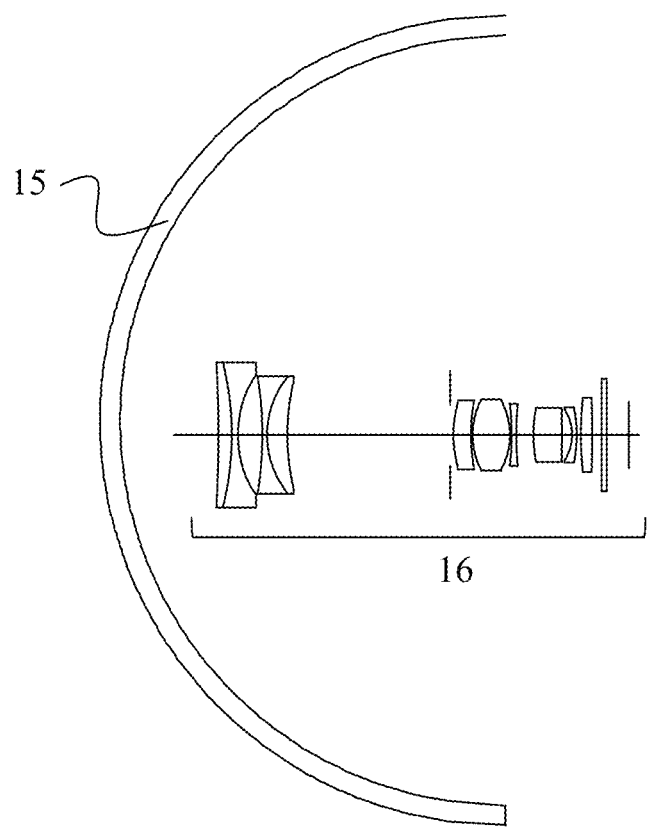
FIG. 21 is a configuration diagram illustrating an image pickup apparatus according to each example.
Figure 22:
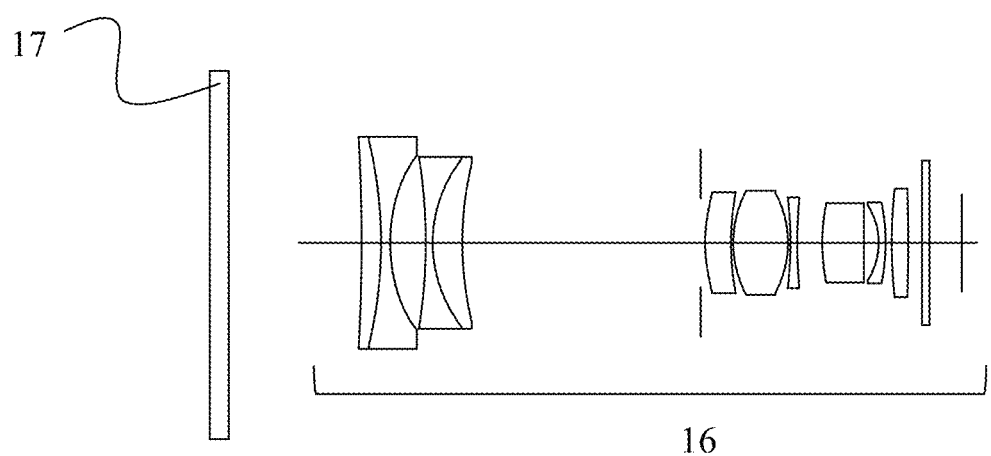
FIG. 22 is a configuration diagram illustrating an image pickup apparatus according to each example.

FIGS. 12 (A), 14 (A), 16 (A), 18 (A), and 20 (A) are aberration diagrams at wide-angle ends of the zoom lenses in the Examples 6 to 10, respectively. FIGS. 12 (B), 14 (B), 16 (B), 18 (B), and 20 (B) are aberration diagrams at middle zoom positions of the zoom lenses in the Examples 6 to 10, respectively. FIGS. 12 (C), 14 (C), 16 (C), 18 (C), and 20 (C) are aberration diagrams at telephoto ends of the zoom lenses in the Examples 6 to 10, respectively.

In each spherical aberration diagram, Fno represents an F-number, and amounts of spherical aberration are indicated for the d-line (wavelength 587.56 nm), g-line (wavelength 435.84 nm), C-line (wavelength 656.27 nm), F-line (wavelength 486.13 nm), and the infrared light (wavelength 850.00 nm). In each astigmatism diagram, M represents an amount of astigmatism in a meridional image plane, and S represents an amount of astigmatism in a sagittal image plane. Each distortion diagram indicates an amount of distortion for the d-line. Each chromatic aberration diagram indicates amounts of chromatic aberration in the g-line, C-line, F-line, and infrared light with respect to the d-line. ω represents an image-pickup half angle of view (°).

Next, a description will be given of characteristic configurations of the zoom lens in each of the Examples 6 to 10.

The zoom lens in each of the Examples 6 to 10 includes, in order from the object side to the image side, a first lens unit L1 having a negative refractive power and a second lens unit L2 having a positive refractive power, and is a negative lead type zoom lens in which the first lens unit L1 and the second lens unit L2 move during zooming. Thereby, it is possible to realize a small-sized wide-angle zoom lens.

The first lens unit includes at least two positive lenses. Thereby, lateral chromatic aberration occurring in the first lens unit L1 can be corrected well.

The zoom lens in each of the Examples 6 to 10 satisfies conditions expressed by the following inequalities (9) to (11).

$$1.87 < Nd1p < 2.15 \quad (9)$$

$$-1.7 < f1/f2 < -0.9 \quad (10)$$

$$0.40 < |dGt/f1| < 0.90 \quad (11)$$

Ndlp represents an average refractive index of the positive lenses in the first lens unit L1. f1 represents a focal length of the first lens unit L1. f2 represents a focal length of the second lens unit L2. dGt represents a distance, i.e., a lens length, on an optical axis from a lens surface closest to the object of the first lens unit L1 to a lens surface closest to the image plane of the first lens unit L1.

The inequality (9) specifies the average refractive index of the positive lenses in the first lens unit L1. When the inequality (9) is satisfied, the first lens unit L1 can be made small. If the average refractive index Ndlp is larger than the upper limit of the inequality (9), there is no selectable lens material. If the average refractive index Ndlp is smaller than the lower limit of the inequality (9), a curvature of a positive lens in the first lens unit L1 increases, and the size of the first lens unit L1 increases.

The inequality (10) specifies a ratio of the focal length f1 of the first lens unit L1 to the focal length f2 of the second lens unit L2. If the refractive power of the first lens unit L1 is so strong for the refractive power of the second lens unit L2 that the value is larger than the upper limit of the inequality (10), lateral chromatic aberration worsens particularly at the wide-angle end. If the refractive power of the first lens unit L1 is so weak for the refractive power of the second lens unit L2 that the value is smaller than the lower limit of the inequality (10), a refractive power of the zoom lens decreases at the wide-angle end, which makes it difficult to make the zoom lens have a wide angle.

The inequality (11) specifies a ratio of the lens length dG1 of the first lens unit L1 to the focal length f1 of the first lens unit L1. If the lens length dG1 of the first lens unit L1 is so long for the refractive power of the first lens unit L1 that the value is larger than the upper limit of the inequality (11), it is difficult to reduce the size of the zoom lens. If the lens length dG1 of the first lens unit L1 is so short for the refractive power of the first lens unit L1 that the value is smaller than the lower limit of the inequality (11), proper curvatures of lenses and distances between lenses cannot be ensured in the first lens unit L1, making it difficult to correct lateral chromatic aberration.

By having the above-described configurations, the zoom lens in each of the Examples 6-10 can have high optical performance capable of correcting lateral chromatic aberration well while having a small size and a wide angle.

The numerical ranges of the inequalities (9) to (11) may be set to numerical ranges of the following inequalities (9a) to (11a).

$$1.87 < Nd1p < 2.11 \quad (9a)$$

$$-1.6 < f1/f2 < -1.0 \quad (10a)$$

$$0.45 < |dG1/f1| < 0.85 \quad (11a)$$

The numerical ranges of the inequalities (9) to (11) may be set to numerical ranges of the following inequalities (9b) to (11b).

$$1.88 < Nd1p < 2.07 \quad (9b)$$

$$-1.5 < f1/f2 < -1.1 \quad (10b)$$

$$0.50 < |dG1/f1| < 0.80 \quad (11b)$$

Next, a description will be given of configurations which the zoom lens in each of the Examples 6-10 may satisfy. The zoom lens in each of the Examples 6-10 may satisfy one or more of the following inequalities (12) to (15).

$$0.00 \leq |TLw - TLt|/ft < 0.30 \quad (12)$$

$$0.28 < M2/TLw < 0.52 \quad (13)$$

$$40 < vd2p < 68 \quad (14)$$

$$0.30 < bfw/f2 < 0.50 \quad (15)$$

TLw represents a distance on the optical axis from the surface closest to the object of the first lens unit L1 to the image plane, i.e., an overall lens length, at the wide-angle end. TLt represents a distance on the optical axis from the surface closest to the object of the first lens unit L1 to the image plane, i.e., overall lens length, at the telephoto end. ft represents a focal length of the zoom lens at the telephoto end. M2 represents a moving amount of the second lens unit L2 from the wide-angle end to the telephoto end. vd2p represents an average Abbe number of the positive lens in the second lens unit L2. bfw represents a distance on the optical axis from a surface closest to the image plane to the image plane, i.e., a back focus, at the wide-angle end.

The inequality (12) specifies a ratio of a difference between the overall lens length TLw at the wide-angle end and the overall lens length TLt at the telephoto end to the focal length ft of the zoom lens at the telephoto end. If the difference between the overall lens length TLw at the wide-angle end and the overall lens length TLt at the telephoto end is so large that the value is larger than the upper limit of the inequality (12), it is difficult to reduce the size of the zoom lens.

The inequality (13) specifies a ratio of the maximum moving amount M2 of the second lens unit L2 to the overall lens length TLw at the wide-angle end. If the maximum moving amount M2 of the second lens unit L2 is so large that the value is larger than the upper limit of the inequality (13), it is difficult to reduce the size of the zoom lens. When the maximum moving amount M2 of the second lens unit L2 is so small that the value is smaller than the lower limit of the inequality (13), the refractive power of the second lens unit L2 increases so as to ensure a zoom ratio and variation in lateral chromatic aberration greatly increases.

The inequality (14) specifies the average Abbe number vd2p of the positive lens in the second lens unit L2. If the average Abbe number vd2p of the positive lens in the second lens unit L2 is larger than the upper limit of the inequality (14), lateral chromatic aberration is excessively corrected in an entire zoom area. If the average Abbe number vd2p of the positive lens in the second lens unit L2 is smaller than the lower limit of the inequality (14), lateral chromatic aberration is insufficiently corrected in the entire zoom area.

The inequality (15) specifies a ratio of the back focus bfw at the wide-angle end to the focal length f2 of the second lens unit L2. If the back focus bfw at the wide-angle end is so long that the value is larger than the upper limit of the inequality (15), it is difficult to reduce the size of the zoom lens. If the back focus bfw at the wide-angle end is so short that the value is smaller than the lower limit of the inequality (15), the refractive power of the first lens unit L1 excessively decreases, making it difficult for the zoom lens to have a wide angle.

The numerical ranges of the inequalities (12) to (15) may be set to numerical ranges of the following inequalities (12a) to (15a).

$$0.00 \leq |TLw - TLt|/ft < 0.23 \tag{12a}$$

$$0.31 < M2/TLw < 0.48 \tag{13a}$$

$$43 < vd2p < 66 \tag{14a}$$

$$0.33 < bfw/f2 < 0.48 \tag{15a}$$

The numerical ranges of the inequalities (12) to (15) may be set to numerical ranges of the following inequalities (12b) to (15b).

$$0.00 \leq |TLw - TLt|/ft < 0.16 \tag{12b}$$

$$0.34 < M2/TLw < 0.44 \tag{13b}$$

$$46 < vd2p < 64 \tag{14b}$$

$$0.36 < bfw/f2 < 0.46 \tag{15b}$$

Next, a detailed description will be given of the zoom lens in each of the Examples 6-10.

Each of the zoom lenses in the Examples 6, 7, 9 and 10 includes, in order from the object side to the image side, the first lens unit L1 having the negative refractive power, the second lens unit L2 having the positive refractive power, and a third lens unit L3 having a positive refractive power. During zooming from the wide-angle end to the telephoto end, the first lens unit L1 moves to the image side and thereafter moves to the object side, the second lens unit L2 moves monotonously to the object side, and the third lens unit L3 does not move. During zooming from the wide-angle end to the telephoto end, a diaphragm SP moves with the second lens unit L2. During focusing, the first lens unit L1 moves on the optical axis.

The zoom lens in the Example 8 includes, in order from the object side to the image side, the first lens unit L1 having the negative refractive power and the second lens unit L2 having the positive refractive power. During zooming from the wide-angle end to the telephoto end, the first lens unit L1 moves to the image side and thereafter moves to the object side, and the second lens unit L2 moves monotonously to the object side. During zooming from the wide-angle end to the telephoto end, a diaphragm SP moves with the second lens unit L2. During focusing, the first lens unit L1 moves on the optical axis.

Among moving trajectories of the first lens unit L1 drawn in each of the sectional views of FIGS. 11, 13, 15, 17, and 19, a solid curved line represents a moving trajectory for correcting an image plane variation during focusing on an object at infinity, the image plane variation being caused by zooming from the wide-angle end to the telephoto end. A dotted curved line represents a moving trajectory for correcting an image plane variation during focusing on the object at close distance, the image plane variation being caused by zooming from the wide-angle end to the telephoto end.

In each of the Examples 6 to 10, focusing is performed by moving the first lens unit L1 on the optical axis, but may be performed by moving the second lens unit L2 on the optical axis.

The diaphragm SP is disposed between the first lens unit L1 and the second lens unit L2, or on a position closest to the object in the second lens unit L2. An aperture diameter of the diaphragm SP may be constant or variable during zooming. When the aperture diameter of the diaphragm SP is changed, it is possible to cut lower ray coma flare caused by an off-axis light beam which greatly occurs at the telephoto end, and hence better optical performance can be acquired.

Further, in the zoom lens in each of the Examples 6 to 10, for example, a cemented lens may be divided and provided with an air distance between the lenses, or a spherical lens may be replaced with an aspherical lens so that further correction is performed on aberration.

Next, Numerical Examples 1 to 10 corresponding to the Examples 1 to 10 will be given. In surface data of each numerical example, r represents a curvature radius of each optical surface, and d (mm) represents an on-axis distance, which is a distance on the optical axis, between an m-th surface and an (m+1) th surface, the m being the number of a surface counted from a light entering side, i.e., the object side. In each numerical example, the last two surfaces are surfaces of an optical block such as a filter and a faceplate. nd represents a refractive index for the d-line of each optical element, and vd represents an Abbe number for the d-line of the optical element. The Abbe number vd of the optical material used in each example is expressed by the following equation, where nF, nd, and nC represent refractive indexes for the F-line (486.13 nm), d-line (587.56 nm), and C-line (656.27 nm) of the Fraunhofer lines.

$$vd = (nd - 1)/(nF - nC)$$

In each numerical example, values of d, focal length f (mm), F-number Fno, and half angle of view (degrees) are all values when the zoom lens in each example focuses on an object at infinity. BF (back focus) represents a distance on the optical axis from a last lens surface, which is a lens surface closest to the image plane, to the paraxial image plane, and is expressed by an air-converted length. An overall lens length is acquired by adding the back focus to a distance on the optical axis from a front surface, which is a lens surface closest to the object, to a last surface of the zoom lens. A lens unit may not include a plurality of lenses, but may include a single lens. A focal length for the d-line is given for each single lens having an optical member between the i-th plane and the i+1-th plane.

When an optical surface is an aspherical surface, a * symbol is attached to the right side of the surface number. An aspherical shape is expressed by the following equation (A), where x represents a displacement amount from a surface vertex in the optical axis direction, h represents a height from the optical axis in a direction orthogonal to the optical axis, R represents a paraxial curvature radius, k represents a conic constant (eccentricity), and A4, A6, A8, and A10 represent aspherical coefficients of respective orders.

$$x = (h^2/R)/\left[1 + \{1 - (1+k)(h/R)^2\}^{1/2}\right] + A4h^4 + A6h^6 + A8h^8 + A10h^{10} \quad (A)$$

"$e \pm XX$" in each aspherical coefficient represents "$x10^{\pm XX}$".

Tables 1 and 2 give relationships between each inequality mentioned above and the numerical values in each numerical example.

<NUMERICAL EXAMPLE 1>
UNIT: mm

SURFACE DATA

| Surface No. | r | d | nd | vd |
|---|---|---|---|---|
| 1 | −122.971 | 1.28 | 2.05090 | 26.9 |
| 2 | −28.596 | 0.60 | 1.88202 | 37.2 |
| 3* | 11.584 | 2.34 | | |
| 4 | −35.401 | 0.45 | 1.49700 | 81.5 |
| 5 | 8.913 | 1.95 | 2.05090 | 26.9 |
| 6 | 22.143 | (Variable) | | |
| 7 (Diaphragm) | ∞ | 0.30 | | |
| 8* | 10.057 | 1.70 | 1.69350 | 53.2 |
| 9* | 18.337 | 0.15 | | |
| 10 | 7.324 | 3.59 | 1.49700 | 81.5 |
| 11 | −6.912 | 0.16 | | |
| 12 | −25.494 | 0.45 | 1.92286 | 18.9 |
| 13 | 32.635 | 1.64 | | |
| 14 | 13.158 | 2.74 | 1.85478 | 24.8 |
| 15 | −401.405 | 0.97 | | |
| 16 | −4.552 | 0.45 | 1.90366 | 31.3 |
| 17 | −13.043 | (Variable) | | |
| 18 | 32.993 | 1.08 | 1.95906 | 17.5 |
| 19 | −118.561 | 0.90 | | |
| 20 | ∞ | 0.50 | 1.52000 | 61.4 |
| 21 | ∞ | 2.12 | | |
| Image Plane | ∞ | | | |

ASPHERICAL SURDACE DATA

3rd Surface

K = 0.00000e+000    A 4 = 1.41581e−004    A 6 = 3.63957e−007    A 8 = 5.61312e−008
A10 = −1.34655e−010

8th Surface

K = 0.00000e+000    A 4 = −4.57301e−004    A 6 = −2.56965e−005    A 8 = −1.44572e−006
A10 = 1.59999e−008

9th Surface

K = 0.00000e+000    A 4 = 7.93148e−005    A 6 = 1.13199e−006    A 8 = −2.68201e−006
A10 = 1.77107e−007

-continued

<NUMERICAL EXAMPLE 1>
UNIT: mm

VARIOUS DATA
Zoom Ratio 4.90

|  | Wide-Angle | Middle | Telephoto |
| --- | --- | --- | --- |
| Focal Length: | 4.92 | 14.52 | 24.12 |
| F-Number: | 2.10 | 3.70 | 5.30 |
| Half Angle of View (°): | 42.5 | 12.6 | 7.57 |
| Image Height: | 3.20 | 3.20 | 3.20 |
| Overall Lens Length: | 39.42 | 34.37 | 39.43 |
| BF: | 2.12 | 2.12 | 2.12 |
| d 6 | 15.65 | 2.94 | 0.35 |
| d17 | 0.40 | 8.05 | 15.70 |
| d21 | 2.12 | 2.12 | 2.12 |

ZOOM LENS UNIT DATA

| Lens Unit | Starting Surface | Focal Length |
| --- | --- | --- |
| 1 | 1 | −12.67 |
| 2 | 7 | 8.68 |
| 3 | 18 | 27.01 |

CEMENTED LENS DATA

| Starting Surface | Last Surface | Focal Length |
| --- | --- | --- |
| 1 | 3 | −12.62 |
| 4 | 6 | 346.32 |

<NUMERICAL EXAMPLE 2>
UNIT: mm

SURFACE DATA

| Surface No. | r | d | nd | vd |
| --- | --- | --- | --- | --- |
| 1 | −47.768 | 1.63 | 2.00100 | 29.1 |
| 2 | −17.897 | 0.60 | 1.90525 | 35.0 |
| 3 | 9.046 | 2.08 |  |  |
| 4 | −150.026 | 0.45 | 1.49700 | 81.5 |
| 5 | 9.573 | 2.09 | 2.05090 | 26.9 |
| 6 | 42.132 | (Variable) |  |  |
| 7 (Diaphragm) | ∞ | 0.30 |  |  |
| 8* | 10.408 | 1.70 | 1.69350 | 53.2 |
| 9* | 16.897 | 0.15 |  |  |
| 10 | 7.844 | 3.78 | 1.49700 | 81.5 |
| 11 | −6.110 | 0.28 |  |  |
| 12 | −9.386 | 0.45 | 1.95906 | 17.5 |
| 13 | −14.553 | 1.69 |  |  |
| 14 | 74.300 | 3.18 | 1.85025 | 30.1 |
| 15 | −19.106 | 0.72 |  |  |
| 16 | −4.859 | 0.45 | 1.90366 | 31.3 |
| 17 | −29.600 | (Variable) |  |  |
| 18 | 34.035 | 1.11 | 1.92286 | 18.9 |
| 19 | −70.152 | 0.90 |  |  |
| 20 | ∞ | 0.50 | 1.52000 | 61.4 |
| 21 | ∞ | 2.13 |  |  |
| Image Plane | ∞ |  |  |  |

ASPHERICAL SURDACE DATA

8th Surface

K = 0.00000e+000   A 4 = −4.91818e−004   A 6 = −1.64329e−005   A 8 = −2.25232e−006
A10 = 1.37587e−008

9th Surface

K = 0.00000e+000   A 4 = 7.93148e−005   A 6 = 1.77230e−005   A 8 = −4.22171e−006
A10 = 2.57401e−007

-continued

<NUMERICAL EXAMPLE 2>
UNIT: mm

VARIOUS DATA
Zoom Ratio 4.60

|  | Wide-Angle | Middle | Telephoto |
|---|---|---|---|
| Focal Length: | 4.92 | 13.78 | 22.64 |
| F-Number: | 2.21 | 3.85 | 5.50 |
| Half Angle of View (°): | 40.3 | 13.2 | 8.05 |
| Image Height: | 3.20 | 3.20 | 3.20 |
| Overall Lens Length: | 39.93 | 35.09 | 39.84 |
| BF: | 2.13 | 2.13 | 2.13 |
| d 6 | 15.24 | 3.01 | 0.35 |
| d17 | 0.48 | 7.88 | 15.28 |
| d21 | 2.13 | 2.13 | 2.13 |

ZOOM LENS UNIT DATA

| Lens Unit | Starting Surface | Focal Length |
|---|---|---|
| 1 | 1 | −12.46 |
| 2 | 7 | 8.84 |
| 3 | 18 | 24.96 |

CEMENTED LENS DATA

| Starting Surface | Last Surface | Focal Length |
|---|---|---|
| 1 | 3 | −8.48 |
| 4 | 6 | 32.23 |

<NUMERICAL EXAMPLE 3>
UNIT: mm

SURFACE DATA

| Surface No. | r | d | nd | vd |
|---|---|---|---|---|
| 1 | 95.927 | 0.60 | 2.05090 | 26.9 |
| 2 | 11.639 | 1.33 | 1.69350 | 53.2 |
| 3* | 16.486 | 3.02 | | |
| 4 | −10.843 | 0.45 | 1.49700 | 81.5 |
| 5 | 12.934 | 1.44 | 1.95906 | 17.5 |
| 6 | 49.257 | (Variable) | | |
| 7 (Diaphragm) | ∞ | 0.30 | | |
| 8* | 9.347 | 1.70 | 1.58313 | 59.4 |
| 9* | 23.866 | 0.15 | | |
| 10 | 8.315 | 3.74 | 1.49700 | 81.5 |
| 11 | −8.261 | 0.36 | | |
| 12 | −21.277 | 0.45 | 1.95906 | 17.5 |
| 13 | 119.493 | 2.01 | | |
| 14 | 16.345 | 2.62 | 1.80000 | 29.8 |
| 15 | −48.763 | 0.91 | | |
| 16 | −5.188 | 0.45 | 1.90366 | 31.3 |
| 17 | −10.584 | 0.40 | | |
| 18 | 17.591 | 1.32 | 1.95906 | 17.5 |
| 19 | 19.063 | (Variable) | | |
| 20 | ∞ | 0.50 | 1.52000 | 61.4 |
| 21 | ∞ | 2.70 | | |
| Image Plane | ∞ | | | |

ASPHERICAL SURDACE DATA

3rd Surface

K = 0.00000e+000  A 4 = 1.44424e−004  A 6 = 1.67835e−006  A 8 = −3.23823e−008
A10 = 2.05884e−009

8th Surface

K = 0.00000e+000  A 4 = −4.09901e−004  A 6 = −1.49287e−005  A 8 = −1.67695e−006
A10 = 8.48762e−009

<NUMERICAL EXAMPLE 3>
UNIT: mm

9th Surface

K = 0.00000e+000   A 4 = 7.93148e−005   A 6 = 2.44940e−006   A 8 = −2.77573e−006
A10 = 8.95995e−008

VARIOUS DATA
Zoom Ratio 4.29

|  | Wide-Angle | Middle | Telephoto |
|---|---|---|---|
| Focal Length: | 4.92 | 13.03 | 21.13 |
| F-Number: | 2.07 | 3.29 | 4.50 |
| Half Angle of View (°): | 44.4 | 14.2 | 8.69 |
| Image Height: | 3.20 | 3.20 | 3.20 |
| Overall Lens Length: | 39.00 | 34.84 | 39.04 |
| BF: | 2.70 | 2.70 | 2.70 |
| d 6 | 13.78 | 2.89 | 0.35 |
| d19 | 0.77 | 7.50 | 14.23 |
| d21 | 2.70 | 2.70 | 2.70 |

ZOOM LENS UNIT DATA

| Lens Unit | Starting Surface | Focal Length |
|---|---|---|
| 1 | 1 | −10.18 |
| 2 | 7 | 8.46 |

CEMENTED LENS DATA

| Starting Surface | Last Surface | Focal Length |
|---|---|---|
| 1 | 3 | −16.07 |
| 4 | 6 | −33.90 |

<NUMERICAL EXAMPLE 4>
UNIT: mm

SURFACE DATA

| Surface No. | r | d | nd | vd |
|---|---|---|---|---|
| 1 | 89.715 | 0.70 | 2.05090 | 26.9 |
| 2 | 13.857 | 0.30 | | |
| 3 | 16.039 | 0.50 | 1.90043 | 37.4 |
| 4 | 10.215 | 1.45 | 1.80610 | 40.7 |
| 5* | 18.501 | 2.60 | | |
| 6 | −9.702 | 0.45 | 1.49700 | 81.5 |
| 7 | 13.449 | 1.42 | 1.95906 | 17.5 |
| 8 | 54.210 | (Variable) | | |
| 9 (Diaphragm) | ∞ | 0.30 | | |
| 10* | 9.414 | 1.70 | 1.55332 | 71.7 |
| 11* | 41.607 | 0.15 | | |
| 12 | 8.424 | 3.56 | 1.49700 | 81.5 |
| 13 | −8.698 | 0.32 | | |
| 14 | −26.122 | 0.45 | 1.95906 | 17.5 |
| 15 | 59.765 | 2.15 | | |
| 16 | 16.616 | 2.57 | 1.80000 | 29.8 |
| 17 | −37.428 | 0.91 | | |
| 18 | −5.269 | 0.45 | 1.90366 | 31.3 |
| 19 | −12.264 | 0.40 | | |
| 20 | 24.204 | 0.95 | 1.95906 | 17.5 |
| 21 | 32.823 | (Variable) | | |
| 22 | ∞ | 0.50 | 1.52000 | 61.4 |
| 23 | ∞ | 0.45 | | |
| Image Plane | ∞ | | | |

<NUMERICAL EXAMPLE 4>
UNIT: mm

ASPHERICAL SURDACE DATA

5th Surface

K = 0.00000e+000   A 4 = 1.11134e−004   A 6 = 1.26081e−006   A 8 = −1.14637e−008
A10 = 1.38765e−009

10th Surface

K = 0.00000e+000   A 4 = −4.41340e−004   A 6 = −1.37936e−005   A 8 = −1.78258e−006
A10 = −1.74217e−010

11th Surface

K = 0.00000e+000   A 4 = 7.93148e−005   A 6 = 2.65801e−006   A 8 = −2.77408e−006
A10 = 7.50166e−008

VARIOUS DATA
Zoom Ratio 4.50

|  | Wide-Angle | Middle | Telephoto |
|---|---|---|---|
| Focal Length: | 4.60 | 12.65 | 20.70 |
| F-Number: | 2.15 | 3.44 | 4.75 |
| Half Angle of View (°): | 49.7 | 14.6 | 8.87 |
| Image Height: | 3.20 | 3.20 | 3.20 |
| Overall Lens Length: | 39.00 | 34.68 | 39.03 |
| BF: | 0.45 | 0.45 | 0.45 |
| d 8 | 13.96 | 2.82 | 0.35 |
| d21 | 2.76 | 9.59 | 16.41 |
| d23 | 0.45 | 0.45 | 0.45 |

ZOOM LENS UNIT DATA

| Lens Unit | Starting Surface | Focal Length |
|---|---|---|
| 1 | 1 | −9.75 |
| 2 | 9 | 8.26 |

CEMENTED LENS DATA

| Starting Surface | Last Surface | Focal Length |
|---|---|---|
| 3 | 5 | 173.71 |
| 6 | 8 | −28.97 |

<NUMERICAL EXAMPLE 5>
UNIT: mm

SURFACE DATA

| Surface No. | r | d | nd | vd |
|---|---|---|---|---|
| 1 | −701.401 | 1.20 | 2.05090 | 26.9 |
| 2 | −76.233 | 0.60 | 1.58313 | 59.4 |
| 3* | 13.850 | 1.80 | | |
| 4 | ∞ | 0.70 | 1.69680 | 55.5 |
| 5 | 29.466 | 1.68 | | |
| 6 | −16.719 | 0.45 | 1.65160 | 58.5 |
| 7 | 11.132 | 1.87 | 2.05090 | 26.9 |
| 8 | 49.984 | (Variable) | | |
| 9 (Diaphragm) | ∞ | 0.50 | | |
| 10* | 9.300 | 1.70 | 1.69350 | 53.2 |
| 11* | 21.612 | 0.15 | | |
| 12 | 7.398 | 3.37 | 1.49700 | 81.5 |
| 13 | −8.308 | 0.15 | | |
| 14 | 67.261 | 0.45 | 1.89286 | 20.4 |
| 15 | 7.601 | 1.05 | | |
| 16 | 8.027 | 3.37 | 1.73800 | 32.3 |
| 17 | −165.697 | 1.03 | | |
| 18 | −4.433 | 0.45 | 1.60311 | 60.6 |
| 19 | −16.535 | (Variable) | | |
| 20 | 26.723 | 1.16 | 1.90366 | 31.3 |
| 21 | −54.872 | 0.90 | | |

-continued

<NUMERICAL EXAMPLE 5>
UNIT: mm

| | | | | |
|---|---|---|---|---|
| 22 | ∞ | 0.50 | 1.52000 | 61.4 |
| 23 | ∞ | 2.12 | | |
| Image Plane | ∞ | | | |

ASPHERICAL SURDACE DATA

3rd Surface

K = 0.00000e+000   A 4 = 1.47374e−004   A 6 = 1.22538e−006   A 8 = 1.34899e−008
A10 = 1.33362e−009

10th Surface

K = 0.00000e+000   A 4 = −5.04208e−004   A 6 = −2.50613e−005   A 8 = −1.39196e−006
A10 = 4.35507e−010

11th Surface

K = 0.00000e+000   A 4 = 7.93148e−005   A 6 = −1.26384e−005   A 8 = −1.89698e−006
A10 = 7.97661e−008

VARIOUS DATA
Zoom Ratio 4.80

| | Wide-Angle | Middle | Telephoto |
|---|---|---|---|
| Focal Length: | 4.50 | 13.05 | 21.60 |
| F-Number: | 2.08 | 3.64 | 5.20 |
| Half Angle of View (°): | 50.6 | 14.2 | 8.48 |
| Image Height: | 3.20 | 3.20 | 3.20 |
| Overall Lens Length: | 39.01 | 36.44 | 42.42 |
| BF: | 2.12 | 2.12 | 2.12 |
| d 8 | 13.41 | 2.60 | 0.35 |
| d19 | 0.40 | 8.63 | 16.87 |
| d23 | 2.12 | 2.12 | 2.12 |

ZOOM LENS UNIT DATA

| Lens Unit | Starting Surface | Focal Length |
|---|---|---|
| 1 | 1 | −10.81 |
| 2 | 9 | 8.45 |
| 3 | 20 | 20.02 |

CEMENTED LENS DATA

| Starting Surface | Last Surface | Focal Length |
|---|---|---|
| 1 | 3 | −26.72 |
| 6 | 8 | −41.66 |

<NUMERICAL EXAMPLE 6>
UNIT: mm

SURFACE DATA

| Surface No. | r | d | nd | vd |
|---|---|---|---|---|
| 1 | −122.971 | 1.28 | 2.05090 | 26.9 |
| 2 | −28.596 | 0.60 | 1.88202 | 37.2 |
| 3* | 11.584 | 2.34 | | |
| 4 | −35.401 | 0.45 | 1.49700 | 81.5 |
| 5 | 8.913 | 1.95 | 2.05090 | 26.9 |
| 6 | 22.143 | (Variable) | | |
| 7 (Diaphragm) | ∞ | 0.30 | | |
| 8* | 10.057 | 1.70 | 1.69350 | 53.2 |
| 9* | 18.337 | 0.15 | | |
| 10 | 7.324 | 3.59 | 1.49700 | 81.5 |
| 11 | −6.912 | 0.16 | | |
| 12 | −25.494 | 0.45 | 1.92286 | 18.9 |
| 13 | 32.635 | 1.64 | | |
| 14 | 13.158 | 2.74 | 1.85478 | 24.8 |
| 15 | −401.405 | 0.97 | | |
| 16 | −4.552 | 0.45 | 1.90366 | 31.3 |
| 17 | −13.043 | (Variable) | | |

-continued

<NUMERICAL EXAMPLE 6>
UNIT: mm

| | | | | |
|---|---|---|---|---|
| 18 | 32.993 | 1.08 | 1.95906 | 17.5 |
| 19 | −118.561 | 0.90 | | |
| 20 | ∞ | 0.50 | 1.52000 | 61.4 |
| 21 | ∞ | 2.12 | | |
| Image Plane | ∞ | | | |

ASPHERICAL SURDACE DATA

3rd Surface $K = 0.00000e+000$  $A4 = 1.41581e-004$  $A6 = 3.63957e-007$  $A8 = 5.61312e-008$
$A10 = -1.34655e-010$ 8th Surface $K = 0.00000e+000$  $A4 = -4.57301e-004$  $A6 = -2.56965e-005$  $A8 = -1.44572e-006$
$A10 = 1.59999e-008$ 9th Surface $K = 0.00000e+000$  $A4 = 7.93148e-005$  $A6 = 1.13199e-006$  $A8 = -2.68201e-006$
$A10 = 1.77107e-007$

VARIOUS DATA
Zoom Ratio 4.90

| | Wide-Angle | Middle | Telephoto |
|---|---|---|---|
| Focal Length: | 4.92 | 14.52 | 24.12 |
| F-Number: | 2.10 | 3.70 | 5.30 |
| Half Angle of View (°): | 42.5 | 12.6 | 7.57 |
| Image Height: | 3.20 | 3.20 | 3.20 |
| Overall Lens Length: | 39.42 | 34.37 | 39.43 |
| BF: | 2.12 | 2.12 | 2.12 |
| BF in air: | 3.35 | 3.35 | 3.35 |
| d 6 | 15.65 | 2.94 | 0.35 |
| d17 | 0.40 | 8.05 | 15.70 |
| d21 | 2.12 | 2.12 | 2.12 |

ZOOM LENS UNIT DATA

| Lens Unit | Starting Surface | Focal Length |
|---|---|---|
| 1 | 1 | −12.67 |
| 2 | 7 | 8.68 |
| 3 | 18 | 27.01 |

<NUMERICAL EXAMPLE 7>
UNIT: mm

SURFACE DATA

| Surface No. | r | d | nd | vd |
|---|---|---|---|---|
| 1 | −47.768 | 1.63 | 2.00100 | 29.1 |
| 2 | −17.897 | 0.60 | 1.90525 | 35.0 |
| 3 | 9.046 | 2.08 | | |
| 4 | −150.026 | 0.45 | 1.49700 | 81.5 |
| 5 | 9.573 | 2.09 | 2.05090 | 26.9 |
| 6 | 42.132 | (Variable) | | |
| 7 (Diaphragm) | ∞ | 0.30 | | |
| 8* | 10.408 | 1.70 | 1.69350 | 53.2 |
| 9* | 16.897 | 0.15 | | |
| 10 | 7.844 | 3.78 | 1.49700 | 81.5 |
| 11 | −6.110 | 0.28 | | |
| 12 | −9.386 | 0.45 | 1.95906 | 17.5 |
| 13 | −14.553 | 1.69 | | |
| 14 | 74.300 | 3.18 | 1.85025 | 30.1 |
| 15 | −19.106 | 0.72 | | |
| 16 | −4.859 | 0.45 | 1.90366 | 31.3 |
| 17 | −29.600 | (Variable) | | |
| 18 | 34.035 | 1.11 | 1.92286 | 18.9 |
| 19 | −70.152 | 0.90 | | |

-continued

<NUMERICAL EXAMPLE 7>
UNIT: mm

| | | | | |
|---|---|---|---|---|
| 20 | ∞ | 0.50 | 1.52000 | 61.4 |
| 21 | ∞ | 2.13 | | |
| Image Plane | ∞ | | | |

ASPHERICAL SURDACE DATA

8th Surface

K = 0.00000e+000   A 4 = −4.91818e−004   A 6 = −1.64329e−005   A 8 = −2.25232e−006
A10 = 1.37587e−008

9th Surface

K = 0.00000e+000   A 4 = 7.93148e−005   A 6 = 1.77230e−005   A 8 = −4.22171e−006
A10 = 2.57401e−007

VARIOUS DATA
Zoom Ratio 4.60

| | Wide-Angle | Middle | Telephoto |
|---|---|---|---|
| Focal Length: | 4.92 | 13.78 | 22.64 |
| F-Number: | 2.21 | 3.85 | 5.50 |
| Half Angle of View (°): | 40.3 | 13.2 | 8.05 |
| Image Height: | 3.20 | 3.20 | 3.20 |
| Overall Lens Length: | 39.93 | 35.09 | 39.84 |
| BF: | 2.13 | 2.13 | 2.13 |
| BF in air: | 3.36 | 3.36 | 3.36 |
| d 6 | 15.24 | 3.01 | 0.35 |
| d17 | 0.48 | 7.88 | 15.28 |
| d21 | 2.13 | 2.13 | 2.13 |

ZOOM LENS UNIT DATA

| Lens Unit | Starting Surface | Focal Length |
|---|---|---|
| 1 | 1 | −12.46 |
| 2 | 7 | 8.84 |
| 3 | 18 | 24.96 |

<NUMERICAL EXAMPLE 8>
UNIT: mm

SURFACE DATA

| Surface No. | r | d | nd | vd |
|---|---|---|---|---|
| 1 | 89.715 | 0.70 | 2.05090 | 26.9 |
| 2 | 13.857 | 0.30 | | |
| 3 | 16.039 | 0.50 | 1.90043 | 37.4 |
| 4 | 10.215 | 1.45 | 1.80610 | 40.7 |
| 5* | 18.501 | 2.60 | | |
| 6 | −9.702 | 0.45 | 1.49700 | 81.5 |
| 7 | 13.449 | 1.42 | 1.95906 | 17.5 |
| 8 | 54.210 | (Variable) | | |
| 9 (Diaphragm) | ∞ | 0.30 | | |
| 10* | 9.414 | 1.70 | 1.55332 | 71.7 |
| 11* | 41.607 | 0.15 | | |
| 12 | 8.424 | 3.56 | 1.49700 | 81.5 |
| 13 | −8.698 | 0.32 | | |
| 14 | −26.122 | 0.45 | 1.95906 | 17.5 |
| 15 | 59.765 | 2.15 | | |
| 16 | 16.616 | 2.57 | 1.80000 | 29.8 |
| 17 | −37.428 | 0.91 | | |
| 18 | −5.269 | 0.45 | 1.90366 | 31.3 |
| 19 | −12.264 | 0.40 | | |
| 20 | 24.204 | 0.95 | 1.95906 | 17.5 |
| 21 | 32.823 | (Variable) | | |
| 22 | ∞ | 0.50 | 1.52000 | 61.4 |
| 23 | ∞ | 0.45 | | |
| Image Plane | ∞ | | | |

<NUMERICAL EXAMPLE 8>
UNIT: mm

ASPHERICAL SURDACE DATA

5th Surface

K = 0.00000e+000   A 4 = 1.11134e−004   A 6 = 1.26081e−006   A 8 = −1.14637e−008
A10 = 1.38765e−009

10th Surface

K = 0.00000e+000   A 4 = −4.41340e−004   A 6 = −1.37936e−005   A 8 = −1.78258e−006
A10 = −1.74217e−010

11th Surface

K = 0.00000e+000   A 4 = 7.93148e−005   A 6 = 2.65801e−006   A 8 = −2.77408e−006
A10 = 7.50166e−008

VARIOUS DATA
Zoom Ratio 4.50

|  | Wide-Angle | Middle | Telephoto |
|---|---|---|---|
| Focal Length: | 4.60 | 12.65 | 20.70 |
| F-Number: | 2.15 | 3.44 | 4.75 |
| Half Angle of View (°): | 49.7 | 14.6 | 8.87 |
| Image Height: | 3.20 | 3.20 | 3.20 |
| Overall Lens Length: | 39.00 | 34.68 | 39.03 |
| BF: | 0.45 | 0.45 | 0.45 |
| BF in air: | 3.55 | 10.37 | 17.19 |
| d 8 | 13.96 | 2.82 | 0.35 |
| d21 | 2.76 | 9.59 | 16.41 |
| d23 | 0.45 | 0.45 | 0.45 |

ZOOM LENS UNIT DATA

| Lens Unit | Starting Surface | Focal Length |
|---|---|---|
| 1 | 1 | −9.75 |
| 2 | 9 | 8.26 |

<NUMERICAL EXAMPLE 9>
UNIT: mm
SURFACE DATA

| Surface No. | r | d | nd | vd |
|---|---|---|---|---|
| 1 | −701.401 | 1.20 | 2.05090 | 26.9 |
| 2 | −76.233 | 0.60 | 1.58313 | 59.4 |
| 3* | 13.850 | 1.80 | | |
| 4 | ∞ | 0.70 | 1.69680 | 55.5 |
| 5 | 29.466 | 1.68 | | |
| 6 | −16.719 | 0.45 | 1.65160 | 58.5 |
| 7 | 11.132 | 1.87 | 2.05090 | 26.9 |
| 8 | 49.984 | (Variable) | | |
| 9 (Diaphragm) | ∞ | 0.50 | | |
| 10* | 9.300 | 1.70 | 1.69350 | 53.2 |
| 11* | 21.612 | 0.15 | | |
| 12 | 7.398 | 3.37 | 1.49700 | 81.5 |
| 13 | −8.308 | 0.15 | | |
| 14 | 67.261 | 0.45 | 1.89286 | 20.4 |
| 15 | 7.601 | 1.05 | | |
| 16 | 8.027 | 3.37 | 1.73800 | 32.3 |
| 17 | −165.697 | 1.03 | | |
| 18 | −4.433 | 0.45 | 1.60311 | 60.6 |
| 19 | −16.535 | (Variable) | | |
| 20 | 26.723 | 1.16 | 1.90366 | 31.3 |
| 21 | −54.872 | 0.90 | | |
| 22 | ∞ | 0.50 | 1.52000 | 61.4 |
| 23 | ∞ | 2.12 | | |
| Image Plane | ∞ | | | |

-continued

<NUMERICAL EXAMPLE 9>
UNIT: mm
SURFACE DATA

ASPHERICAL SURDACE DATA

3rd Surface

K = 0.00000e+000   A 4 = 1.47374e-004   A 6 = 1.22538e-006   A 8 = 1.34899e-008
A10 = 1.33362e-009
10th Surface K = 0.00000e+000   A 4 = -5.04208e-004   A 6 = -2.50613e-005   A 8 = -1.39196e-006
A 10 = 4.35507e-010
11th Surface K = 0.00000e+000   A 4 = 7.93148e-005   A 6 = -1.26384e-005   A 8 = -1.89698e-006
A10 = 7.97661e-008

VARIOUS DATA
Zoom Ratio 4.80

|  | Wide-Angle | Middle | Telephoto |
|---|---|---|---|
| Focal Length: | 4.50 | 13.05 | 21.60 |
| F-Number: | 2.08 | 3.64 | 5.20 |
| Half Angle of View (°): | 50.6 | 14.2 | 8.48 |
| Image Height: | 3.20 | 3.20 | 3.20 |
| Overall Lens Length: | 39.01 | 36.44 | 42.42 |
| BF: | 2.12 | 2.12 | 2.12 |
| BF in air | 3.35 | 3.35 | 3.35 |
| d 8 | 13.41 | 2.60 | 0.35 |
| d19 | 0.40 | 8.63 | 16.87 |
| d23 | 2.12 | 2.12 | 2.12 |

ZOOM LENS UNIT DATA

| Lens Unit | Starting Surface | Focal Length |
|---|---|---|
| 1 | 1 | -10.81 |
| 2 | 9 | 8.45 |
| 3 | 20 | 20.02 |

<NUMERICAL EXAMPLE 10>
UNIT: mm
SURFACE DATA

| Surface No. | r | d | nd | vd |
|---|---|---|---|---|
| 1 | -40.000 | 1.50 | 2.00100 | 29.1 |
| 2 | -29.556 | 0.30 | | |
| 3 | -28.582 | 0.50 | 1.89190 | 37.1 |
| 4 | 9.060 | 1.71 | | |
| 5 | -47.563 | 0.51 | 1.49700 | 81.5 |
| 6 | 9.699 | 2.16 | 2.05090 | 26.9 |
| 7 | 56.949 | (Variable) | | |
| 8 (Diaphragm) | ∞ | 0.30 | | |
| 9* | 9.329 | 1.54 | 1.58313 | 59.4 |
| 10* | 15.586 | 0.16 | | |
| 11 | 7.721 | 3.92 | 1.49700 | 81.5 |
| 12 | -6.427 | 0.16 | | |
| 13 | -10.153 | 0.45 | 1.95906 | 17.5 |
| 14 | -19.279 | 2.10 | | |
| 15 | 22.232 | 2.39 | 1.72047 | 34.7 |
| 16 | 2555.130 | 1.10 | | |
| 17 | -4.466 | 0.45 | 1.71999 | 50.2 |
| 18 | -10.789 | (Variable) | | |
| 19 | 19.041 | 1.61 | 1.91082 | 35.3 |
| 20 | 67.414 | 0.90 | | |
| 21 | ∞ | 0.50 | 1.52000 | 61.4 |
| 22 | ∞ | 2.15 | | |
| Image Plane | ∞ | | | |

-continued

<NUMERICAL EXAMPLE 10>
UNIT: mm
SURFACE DATA

ASPHERICAL SURDACE DATA

9th Surface

K = 0.00000e+000  A 4 = −4.92630e−004  A 6 = −8.76794e−006  A 8 = −2.86951e−006
A10 = 3.18205−008

10th Surface

K = 0.00000e+000  A 4 = 7.93148e−005  A 6 = 3.14473e−005  A 8 = −5.78935e−006
A10 = 2.83099−007

VARIOUS DATA
Zoom Ratio 4.17

|  | Wide-Angle | Middle | Telephoto |
|---|---|---|---|
| Focal Length: | 4.95 | 12.81 | 20.66 |
| F-Number: | 2.04 | 3.47 | 4.90 |
| Half Angle of View (°): | 40.7 | 14.4 | 8.84 |
| Image Height: | 3.20 | 3.20 | 3.20 |
| Overall Lens Length: | 38.46 | 35.08 | 39.85 |
| BF: | 2.15 | 2.15 | 2.15 |
| BF in air: | 3.38 | 3.38 | 3.38 |
| d 7 | 13.63 | 2.92 | 0.35 |
| d18 | 0.40 | 7.74 | 15.07 |
| d22 | 2.15 | 2.15 | 2.15 |

ZOOM LENS UNIT DATA

| Lens Unit | Starting Surface | Focal Length |
|---|---|---|
| 1 | 1 | −11.43 |
| 2 | 8 | 8.98 |
| 3 | 19 | 28.68 |

TABLE 1

|  | Expression | Ex. 1 | Ex. 2 | Ex. 3 | Ex. 4 | Ex. 5 |
|---|---|---|---|---|---|---|
| (1) | Nd1p | 2.05 | 2.03 | 1.83 | 1.88 | 2.05 |
| (2) | f1/f2 | −1.46 | −1.41 | −1.20 | −1.18 | −1.28 |
| (3) | |1Gt/f1| | 0.52 | 0.55 | 0.67 | 0.76 | 0.77 |
| (4) | f1a/f1 | 1.00 | 0.68 | 1.58 | 2.97 | 2.47 |
| (5) | |TLw-TLt|/ft | 0.00009 | 0.00410 | 0.00179 | 0.00162 | 0.15785 |
| (6) | M2/TLw | 0.39 | 0.37 | 0.35 | 0.35 | 0.42 |
| (7) | vd2p | 53.18 | 54.93 | 47.06 | 50.14 | 55.69 |
| (8) | bfw/f2 | 0.39 | 0.38 | 0.45 | 0.43 | 0.40 |

TABLE 2

|  | Expression | Ex. 6 | Ex. 7 | Ex. 8 | Ex. 9 | Ex. 10 |
|---|---|---|---|---|---|---|
| (9) | Nd1p | 2.051 | 2.026 | 1.883 | 2.051 | 2.026 |
| (10) | f1/f2 | −1.459 | −1.409 | −1.180 | −1.279 | −1.272 |
| (11) | |dGt/f1| | 0.52 | 0.55 | 0.76 | 0.77 | 0.58 |
| (12) | |TLw-TLt|/ft | 0.00041 | 0.00398 | 0.00145 | 0.15787 | 0.06728 |
| (13) | M2/TLw | 0.388 | 0.371 | 0.350 | 0.422 | 0.381 |
| (14) | vd2p | 53.18 | 54.93 | 50.14 | 55.69 | 58.54 |
| (15) | bfw/f2 | 0.386 | 0.380 | 0.430 | 0.396 | 0.376 |

Next, a description will be given of an image pickup apparatus using the zoom lens in each example as an image pickup optical system with reference to FIGS. 21 to 23B. FIGS. 21 to 23B are configuration diagrams illustrating image pickup apparatuses in each example. In FIGS. 21 to 23B, a reference numeral 16 denotes an image pickup optical system configured by any of the zoom lenses in the Examples 1 to 10. A reference numeral 15 in each of FIGS. 21 and 23B denotes a dome cover configured to protect the image pickup optical system 16. A reference numeral 17 in FIG. 22 denotes a protective glass configured to protect the image pickup optical system 16.

Figures 23A, 23B:
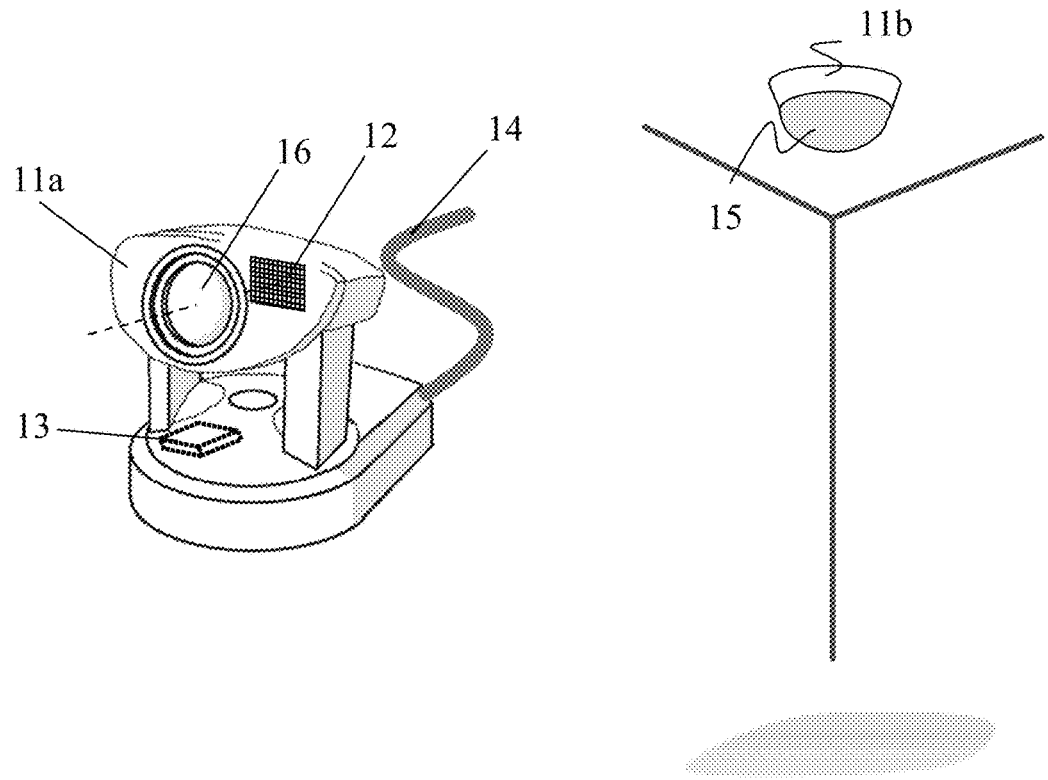
FIGS. 23A and 23B are configuration diagrams illustrating an image pickup apparatus according to each example.

In FIGS. 23A and 23B, reference numerals 11a and 11b denote monitoring camera bodies. The monitoring camera main body 11b is installed on a ceiling so that the dome cover 15 faces downward. A reference numeral 12 denotes an image sensor, which is a photoelectric conversion element, such as a CCD sensor and a CMOS sensor, the image sensor being built in the monitoring camera main body 11a or 11b and being configured to receive light of an object image formed by the image pickup optical system 16, i.e., configured to capture (pick up) an image formed by the zoom lens. A reference numeral 13 denotes a memory configured to store information corresponding to the object image photoelectrically converted by the image sensor 12. A reference numeral 14 denotes a network cable configured to transmit the object image photoelectrically converted by the image sensor 12. The image pickup apparatus according to each example is not limited to the monitoring camera, and can be used as another image pickup apparatus such as a video camera and a digital camera. Further, the image pickup apparatus according to each example may include a circuit configured to electrically correct one or both of distortion and lateral chromatic aberration in addition to the zoom lens of any of the Examples 1 to 10.

Figure 24:
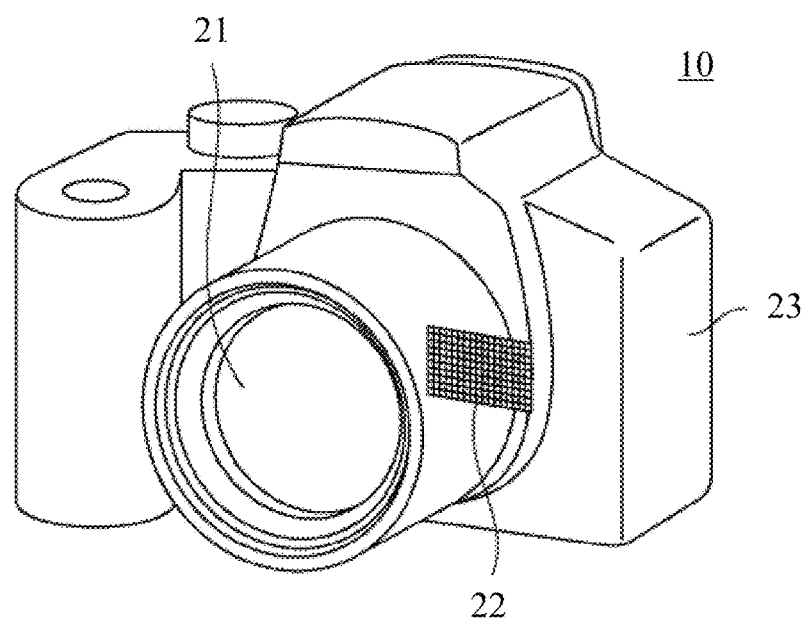
FIG. 24 is a schematic diagram illustrating an image pickup apparatus according to each example.

Next, an example will be described of a digital still camera 10 as an image pickup apparatus using the zoom lens in each example as an image pickup optical system with reference to FIG. 24. In FIG. 24, a reference numeral 21 denotes an image pickup optical system configured by any of the zoom lenses in the Examples 1 to 10. A reference numeral 22 denotes a solid image sensor, which is a photoelectric conversion element, such as a CCD sensor and a CMOS sensor, the image sensor being built in a camera body 23 and being configured to receive light of an optical image formed by the image pickup optical system 21 and to photoelectrically convert the optical image. The camera body 23 may be a so-called single-lens reflex camera having a quick turn mirror, or may be a so-called mirror-less camera not having a quick turn mirror.

When the zoom lens of the present disclosure is used in an image pickup apparatus such as a digital still camera, it is possible to acquire an image pickup apparatus having a small-sized lens.

The digital still camera 10 may include a circuit configured to electrically correct at least one of distortion and lateral chromatic aberration. Electrically correcting lateral chromatic aberration can make it easy to reduce color blur in an image and to improve resolution.

An image pickup system (monitoring camera system) may be configured by using the zoom lens in each example and a controlling unit configured to control the zoom lens. In this case, the controlling unit is configured to control the zoom lens so that each lens unit moves as described above during zooming, focusing, and image stabilization. The controlling unit does not have to be integrally configured with the zoom lens, and the controlling unit may be configured separately from the zoom lens. For example, a configuration may be used in which a controlling unit as a controlling apparatus is located far away from a driving unit configured to drive each lens of the zoom lens, and the controlling unit is provided with a transmitting unit configured to transmit a control signal, i.e., an instruction, for controlling the zoom lens. By using such a controlling unit, the zoom lens can be remotely controlled.

The control unit may be provided with an operation unit such as a controller and a button used for remotely controlling the zoom lens, and the zoom lens may be controlled based on a user's input via the operation unit. For example, an enlargement button and a reduction button may be provided as an operation unit. In this case, the control unit may transmit a signal to a driving unit of the zoom lens so that when the user presses the enlargement button, the magnification of the zoom lens increases, and when the user presses the reduction button, the magnification of the zoom lens decreases.

The image pickup system may include a display unit such as a liquid crystal panel configured to display information on zooming, such as a moving state, of the zoom lens. The information on zooming of the zoom lens is, for example, a zoom magnification, i.e., a zooming state, and a moving amount, i.e., moving state, of each lens unit. In this case, the user can remotely control the zoom lens via the operation unit while viewing the information on zooming of the zoom lens displayed on the display unit. The display unit and the operation unit may be integrated by using, for example, a touch panel.

As described above, when the configuration can manage various aberrations such as distortion of the zoom lens, the number of lenses in the entire zoom lens can be reduced, making it easy to reduce the size of the zoom lens. When lateral chromatic aberration is electrically corrected, it is easy to reduce color blur in a captured image and to improve resolution. According to each example, it is possible to provide, for example, a zoom lens and an image pickup apparatus beneficial in a small size, a wide angle of view, and a high optical performance.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions. For example, further aberration correction may be performed by dividing a cemented lens and providing an air distance between the lenses, or by replacing a spherical lens with an aspherical lens.

This application claims the benefit of Japanese Patent Application No. 2020-170344, filed on Oct. 8, 2020, and Japanese Patent Application No. 2020-173779, filed on Oct. 15, 2020, which are hereby incorporated by reference herein in their entirety.

What is claimed is:
1. A zoom lens comprising, in order from an object side to an image side, a first lens unit having a negative refractive power and a second lens unit having a positive refractive power,
wherein a distance between adjacent lens units changes during zooming,
wherein the first lens unit includes two cemented lenses, and each of the two cemented lenses includes a positive lens, and wherein following inequalities are satisfied:

$$1.80 < Nd1p < 2.15$$
$$-1.5 < f1/f2 < -0.9$$

where Nd1p represents an average refractive index of the positive lenses in the two cemented lenses, f1 represents a focal length of the first lens unit, and f2 represents a focal length of the second lens unit.

2. The zoom lens according to claim 1, wherein a following inequality is satisfied:

$$0.40 < |1Gt/f1| < 0.90$$

where 1Gt represents a length on an optical axis of the first lens unit.

3. The zoom lens according to claim 1, wherein at least one of the two cemented lenses has a negative refractive power, and wherein a following inequality is satisfied:

$$0.50 < f1a/f1 < 3.50$$

where f1a represents a focal length of a cemented lens having the strongest refractive power in the at least one of the two cemented lenses having the negative refractive power.

4. The zoom lens according to claim 1, wherein a following inequality is satisfied:

$$0 \le |TLw - TLt|/ft < 0.30$$

where TLw represents a length from a surface closest to an object to an image plane of the zoom lens at a wide-angle end, TLt represents a length from the surface closest to the object to the image plane of the zoom lens at a telephoto end, and ft represents a focal length of the zoom lens at the telephoto end.

5. The zoom lens according to claim 1, wherein a following inequality is satisfied:

$$0.28 < M2/TLw < 0.52$$

where TLw represents a length from a surface closest to an object to an image plane of the zoom lens at a wide-angle end, and M2 represents a moving amount of the second lens unit from the wide-angle end to a telephoto end.

6. The zoom lens according to claim 1, wherein a following inequality is satisfied:

$$35 < vd2p < 60$$

where vd2p represents an average Abbe number of a positive lenses in the second lens unit.

7. The zoom lens according to claim 1, wherein a following inequality is satisfied:

$$0.30 < bfw/f2 < 0.50$$

where bfw represents a back focus of the zoom lens at a wide-angle end.

8. The zoom lens according to claim 1, wherein during zooming from a wide-angle end to a telephoto end,
the second lens unit moves monotonously to the object side, and
the first lens unit moves to the image side and thereafter moves to the object side.

9. The zoom lens according to claim 1, further comprising a third lens unit having a positive refractive power and disposed on the image side of the second lens unit,
wherein during zooming from a wide-angle end to a telephoto end,
the second lens unit moves monotonously to the object side,
the first lens unit moves to the image side and thereafter moves to the object side, and
the third lens unit does not move.

10. The zoom lens according to claim 1, further comprising a diaphragm,
wherein during zooming from a wide-angle end to a telephoto end, the diaphragm moves with the second lens unit.

11. An image pickup apparatus comprising:
the zoom lens according to claim 1; and
an image pickup element configured to pick up an image formed by the zoom lens.

12. The image pickup apparatus according to claim 11, wherein a following inequality is satisfied:

$$0.40 < |1Gt/f1| < 0.90$$

where 1Gt represents a length on an optical axis of the first lens unit.

13. A zoom lens comprising, in order from an object side to an image side, a first lens unit having a negative refractive power and a second lens unit having a positive refractive power,
wherein during zooming, the first lens unit and the second lens unit move,
wherein the first lens unit includes at least two positive lenses,
wherein following inequalities are satisfied:
1.87 < Nd1p < 2.15
1.5 < f1/f2 < -0.9
0.40 < |dGt/f1| < 0.90
where Nd1p represents an average refractive index of the at least two positive lenses in the first lens unit, f1 represents a focal length of the first lens unit, f2 represents a focal length of the second lens unit, and dGt represents a distance on an optical axis from a lens surface closest to an object of the first lens unit to a lens surface closest to an image of the first lens unit, and
wherein a following inequality is satisfied:

$$0.28 < M2/TLw < 0.52$$

where M2 represents a moving amount of the second lens unit from a wide-angle end to a telephoto end, and TLw represents a distance on the optical axis from a surface closest to the object of the first lens unit to an image plane at a wide-angle end.

14. A zoom lens comprising, in order from an object side to an image side, a first lens unit having a negative refractive power and a second lens unit having a positive refractive power,
   wherein during zooming, the first lens unit and the second lens unit move,
   wherein the first lens unit includes at least two positive lenses,
   wherein a following inequality is satisfied:
   $1.87 < Nd1p < 2.15$
   $1.5 < f1/f2 < -0.9$
   $0.40 < |dGt/f1| < 0.90$
   where Nd1p represents an average refractive index of the at least two positive lenses in the first lens unit, f1 represents a focal length of the first lens unit, f2 represents a focal length of the second lens unit, and dGt represents a distance on an optical axis from a lens surface closest to an object of the first lens unit to a lens surface closest to an image of the first lens unit, and $$0.30 < bfw/f2 < 0.50$$

where bfw represents a distance on the optical axis from a surface closest to the image to an image plane at the wide-angle end.

15. A zoom lens comprising, in order from an object side to an image side, a first lens unit having a negative refractive power and a second lens unit having a positive refractive power,
   wherein during zooming, the first lens unit and the second lens unit move,
   wherein the first lens unit includes at least two positive lenses, and
   wherein following inequalities are satisfied:
   $1.87 < Nd1p < 2.15$
   $1.5 < f1/f2 < -0.9$
   $0.40 < |dGt/f1| < 0.90$
   where Nd1p represents an average refractive index of the at least two positive lenses in the first lens unit, f1 represents a focal length of the first lens unit, f2 represents a focal length of the second lens unit, and dGt represents a distance on an optical axis from a lens surface closest to an object of the first lens unit to a lens surface closest to an image of the first lens unit, and further comprising:
   a third lens unit having a positive refractive power and disposed on the image side of the second lens unit; and
   a diaphragm disposed between the first lens unit and the second lens unit
   wherein during zooming from a wide-angle end to a telephoto end,
      the first lens unit moves to the image side and thereafter moves to the object side,
      the second lens unit moves monotonously to the object side,
      the diaphragm moves with the second lens unit, and
      the third lens unit does not move.

* * * * *